US012680579B2

(12) United States Patent　　(10) Patent No.: US 12,680,579 B2
Dohi et al.　　(45) Date of Patent: Jul. 14, 2026

(54) REVERSE INPUT CUTOFF CLUTCH

(71) Applicant: NSK LTD., Tokyo (JP)

(72) Inventors: Nagao Dohi, Fujisawa (JP); Shohei Kaneko, Fujisawa (JP); Atsushi Maeda, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/682,317

(22) PCT Filed: Apr. 20, 2023

(86) PCT No.: PCT/JP2023/015736

§ 371 (c)(1),
(2) Date: Feb. 8, 2024

(87) PCT Pub. No.: WO2023/218892

PCT Pub. Date: Nov. 16, 2023

(65) Prior Publication Data

US 2025/0129825 A1　　Apr. 24, 2025

(30) Foreign Application Priority Data

May 13, 2022　(JP) ................................. 2022-079538

(51) Int. Cl.
F16D 41/10　　(2006.01)
(52) U.S. Cl.
CPC ................................... F16D 41/10 (2013.01)

(58) Field of Classification Search
CPC ....... F16D 41/10; F16D 41/082; F16D 43/211
See application file for complete search history.

(56) References Cited

U.S. PATENT DOCUMENTS 6,871,735 B2 *　3/2005　Kawai ................... F16D 41/105
192/38
11,415,185 B2 *　8/2022　Dohi ........................ F16D 3/02
(Continued)

FOREIGN PATENT DOCUMENTS

WO　　2019/026794 A1　　2/2019
WO　　2021/172558 A1　　9/2021

OTHER PUBLICATIONS

International Search Report for PCT/JP2023/015736 dated Jul. 4, 2023.

*Primary Examiner* — Huan Le
(74) *Attorney, Agent, or Firm* — Sughrue Mion, PLLC

(57) ABSTRACT

In a reverse input cutoff clutch (1), two contact parts ($P_{I1}$ and $P_{I2}$) of a first group are respectively disposed closer to a first reference line (RL1) than two of a fifth contact part ($P_{O1}$), a sixth contact part ($P_{O2}$), a seventh contact part ($P_{O3}$), and an eighth contact part ($P_{O4}$), and two contact parts ($P_{I3}$ and $P_{I4}$) of a second group are respectively disposed farther from the first reference line (RL1) than the other two of the fifth contact part ($P_{O1}$), the sixth contact part ($P_{O2}$), the seventh contact part ($P_{O3}$), and the eighth contact part ($P_{O4}$).

8 Claims, 13 Drawing Sheets

THE OTHER SIDE IN AXIAL DIRECTION　　ONE SIDE IN AXIAL DIRECTION

(56)                    References Cited

U.S. PATENT DOCUMENTS

| 11,722,035 B2 * | 8/2023 | Kishida ..................... F16D 3/02 |
| | | 310/78 |
| 2021/0262532 A1 | 8/2021 | Toyoda et al. |

* cited by examiner

THE OTHER SIDE IN AXIAL DIRECTION        ONE SIDE IN AXIAL DIRECTION

FIG. 10

PRIOR ART

PRIOR ART

REVERSE INPUT CUTOFF CLUTCH

TECHNICAL FIELD

The present invention relates to a reverse input cutoff clutch.

This Application is a National Stage of International Application No. PCT/JP2023/015736 filed Apr. 20, 2023, claiming priority based on Japanese Patent Application No. 2022-079538 filed May 13, 2022.

BACKGROUND ART

A reverse input cutoff clutch includes an input member connected to an input side mechanism such as a drive source and an output member connected to an output side mechanism such as a speed reduction mechanism, and has a function of, while a rotational torque input to the input member is transmitted to the output member, completely cutting off a rotational torque reversely input to the output member and not transmitting it to the input member, or transmitting only a part of it to the input member to cut off the rest.

Reverse input cutoff clutches are roughly classified into a lock type and a free type depending on a difference in mechanism of cutting off the rotational torque that is reversely input to the output member. A lock-type reverse input cutoff clutch has a mechanism of preventing rotation of the output member when the rotational torque is reversely input to the output member. On the other hand, a free-type reverse input cutoff clutch has a mechanism that idles the output member when the rotational torque is input to the output member. Which of the lock-type reverse input cutoff clutch and the free-type reverse input cutoff clutch is to be used is appropriately determined depending on the intended use of a device incorporating the reverse input cutoff clutch.

Patent Document 1 (PCT International Publication No. WO 2019/026794 Pamphlet) describes a lock-type reverse input cutoff clutch. This reverse input cutoff clutch includes a pressed member, an input member, an output member, and a pair of engagement elements. The pressed member has a pressed surface on an inner circumferential surface. The input member includes a pair of input side engaging parts disposed radially inward of the pressed surface, and is disposed coaxially with the pressed surface. The output member includes an output side engaging part disposed radially inward of the pair of input side engaging parts on an inner side of the pressed surface in the radial direction, and is disposed coaxially with the pressed surface. The engagement elements each include a pair of pressing surfaces facing the pressed surface and spaced apart from each other in a circumferential direction, input side engaged parts engageable with the input side engaging parts, and output side engaged parts engageable with the output side engaging part, and are disposed to be movable in a first direction which is a separating and approaching direction with respect to the pressed surface. In this reverse input cutoff clutch, the input side engaged parts are each formed of a through hole.

In this reverse input cutoff clutch, if a rotational torque is input to the input member, the engagement element moves in a direction away from the pressed surface on the basis of engagement of the input side engaging part with the input side engaged part, and the rotational torque input to the input member is transmitted to the output member when the output side engaged part is engaged with the output side engaging part. On the other hand, if a rotational torque is reversely input to the output member, the engagement element moves in a direction toward the pressed surface on the basis of engagement of the output side engaging part with the output side engaged part, and the pair of pressing surfaces are pressed against the pressed surface so that the pair of pressing surfaces are frictionally engaged with the pressed surface.

CITATION LIST

Patent Document

[Patent Document 1]
PCT International Publication No. WO 2019/026794 Pamphlet

SUMMARY OF INVENTION

Technical Problem

An aspect of the present invention is directed to providing a reverse input cutoff clutch having stable performance and advantageous in reducing manufacturing costs.

Solution to Problem

A reverse input cutoff clutch according to one aspect of the present invention includes a fixed part having an inner wall surface, an input shaft, an input member, an output member, and first and second engagement elements. The input member includes first and second input side engaging parts disposed apart from each other in a first radial direction with a central axis of the input shaft interposed therebetween. The output member includes an output shaft disposed coaxially with the input shaft, and an output side engaging part disposed between the first input side engaging part and the second input side engaging part in the first radial direction. The first and second engagement elements are disposed to be able to change a position and/or a posture thereof. If a rotational torque is input to the input member, the rotational torque is transmitted to the output member via at least one of the first and second engagement elements, and if a rotational torque is input to the output member, at least a part of the rotational torque is transmitted to at least one of the first and second engagement elements to be cut off by a contact between at least one of the first and second engagement elements and the inner wall surface of the fixed part. The first input side engaging part includes a first contact part and a second contact part being able to come into contact with the first engagement element when the rotational torque is input to the input member and disposed apart from each other in a second radial direction orthogonal to the first radial direction. The second input side engaging part includes a third contact part and a fourth contact part being able to come into contact with the second engagement element when the rotational torque is input to the input member and disposed apart from each other in the second radial direction. The output side engaging part includes a fifth contact part and a sixth contact part being able to come into contact with the first engagement element when the rotational torque is input to the output member and disposed apart from each other in the second radial direction. The output side engaging part includes a seventh contact part and an eighth contact part being able to come into contact with the second engagement element when the rotational torque is input to the output member and disposed apart from each other in the second radial direction. A first group including two of the first contact part, the second contact part, the third contact part, and the fourth contact part, and a second group including the other two thereof are disposed apart from each other with a first reference line passing through the central axis and parallel to the first radial direction or a second reference line passing through the central axis and parallel to the second radial direction interposed therebetween. The two contact parts of the first group are respectively disposed closer to the first reference line than two of the fifth contact part, the sixth contact part, the seventh contact part, and the eighth contact part. The two contact parts of the second group are respectively disposed farther from the first reference line than the other two of the fifth contact part, the sixth contact part, the seventh contact part, and the eighth contact part.

Advantageous Effects of Invention

According to one aspect of the present invention, it is possible to provide a reverse input cutoff clutch having stable performance and advantageous in reducing manufacturing costs.

BRIEF DESCRIPTION OF DRAWINGS

FIG. 10 is a view schematically illustrating a reverse input cutoff clutch according to a third embodiment.

DESCRIPTION OF EMBODIMENTS

First Embodiment

Figure 1:
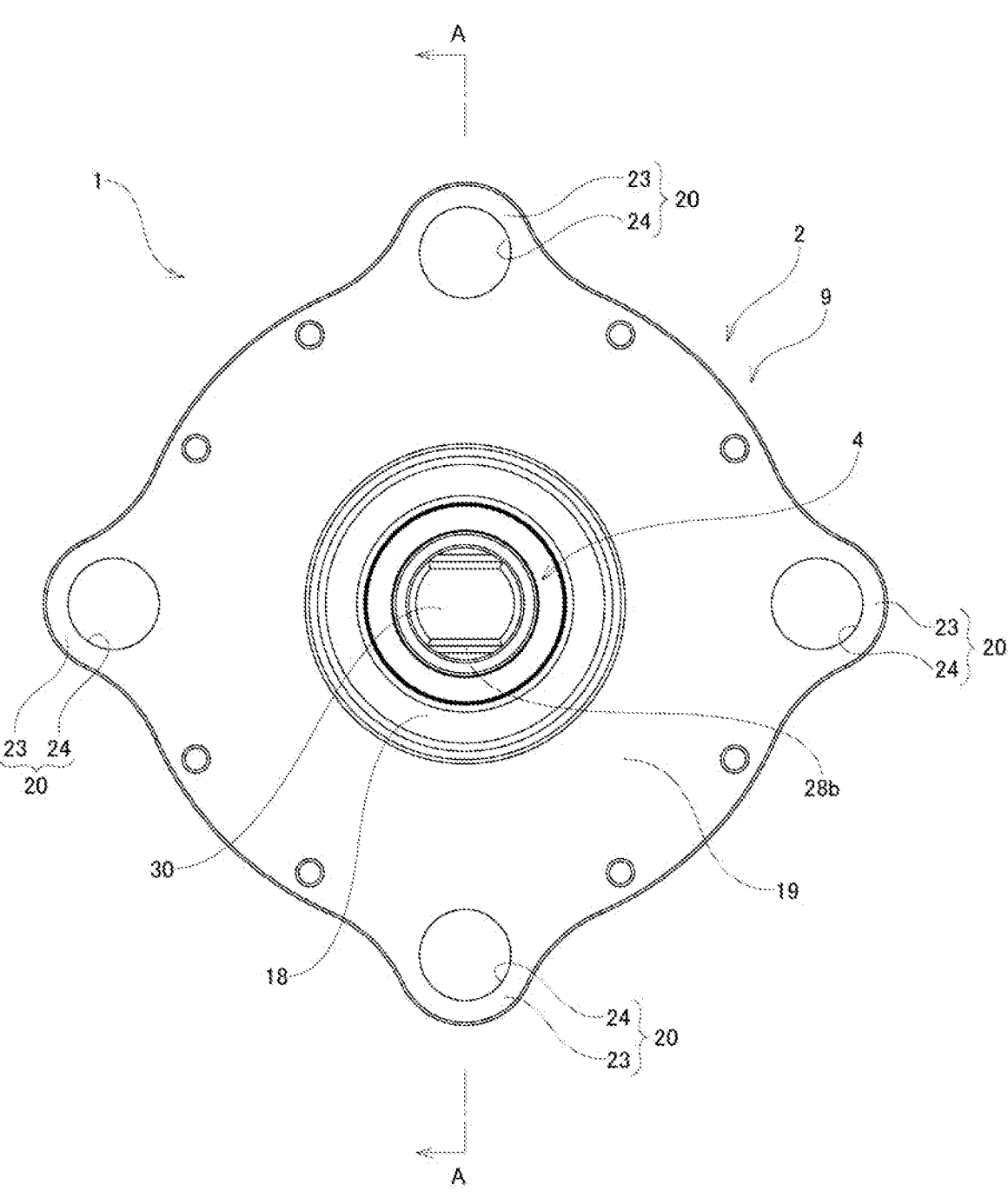
FIG. 1 is an end surface view illustrating a reverse input cutoff clutch according to a first embodiment from an output member side in an axial direction.

A first embodiment will be described with reference to FIGS. 1 to 8. Further, an axial direction, a radial direction, and a circumferential direction refer to an axial direction, a radial direction, and a circumferential direction of a reverse input cutoff clutch 1 unless otherwise specified. In the present embodiment, the axial direction, the radial direction, and the circumferential direction of the reverse input cutoff clutch 1 coincide with an axial direction, a radial direction, and a circumferential direction of an input member 3, and coincide with an axial direction, a radial direction, and a circumferential direction of an output member 4. Also, one side in the axial direction refers to the input member 3 side (right side in FIG. 2), and the other side in the axial direction refers to the output member 4 side (left side in FIG. 2).

<Description of Structure of Reverse Input Cutoff Clutch>

In one example, the reverse input cutoff clutch 1 includes a pressed member (fixed part, fixed frame) 2, the input member 3, the output member 4, a pair of engagement elements 5a and 5b (first engagement element 5a and a second engagement element 5b), and a biasing member 6. In transmission of a rotational torque input to the input member 3 to the output member 4, the reverse input cutoff clutch 1 has a reverse input cutoff function of completely cutting off a rotational torque reversely input to the output member 4 and not transmitting it to the input member 3, or transmitting only a part of it to the input member 3 to cut off the rest. At least a part of the rotational torque input to the output member 4 is transmitted to at least one of the first and second engagement elements 5a and 5b and is cut off by a contact between at least one of the first and second engagement elements 5a and 5b and an inner wall surface of the pressed member 2.

The pressed member 2 includes a cylindrical surface-shaped inner circumferential surface having a pressed surface (contact surface, engagement inner circumferential surface, inner wall surface) 7. The pressed member 2 is supported by and fixed to a fixed portion that does not rotate even in use such as a housing, and rotation thereof is restricted. In the present example, the pressed member 2 is formed in a hollow disc shape as a whole by connecting a first element 8 disposed on one side in the axial direction and a second element 9 disposed on the other side in the axial direction with a plurality of connecting bolts 10.

The first element 8 includes a cylindrical first large-diameter cylindrical part 11, a cylindrical first small-diameter cylindrical part 12, a hollow circular flat plate-shaped first side plate part 13, and a flange part 14.

The first large-diameter cylindrical part 11 has the pressed surface 7 on an inner circumferential surface thereof. The pressed surface 7 is formed of a cylindrical surface centered on a central axis of the first element 8.

The first large-diameter cylindrical part 11 has an inner diameter side fitting surface 15 on an outer circumferential surface of an end portion on the other side in the axial direction which is a portion positioned on the other side in the axial direction with respect to the flange part 14. The inner diameter side fitting surface 15 is formed of a cylindrical surface centered on the central axis of the first element 8.

The first small-diameter cylindrical part 12 is disposed coaxially with the first large-diameter cylindrical part 11 on one side in the axial direction of the first large-diameter cylindrical part 11. The first small-diameter cylindrical part 12 has a first bearing fitting surface 16 in a portion from an end portion to an intermediate portion of an inner circumferential surface on the other side in the axial direction. The first bearing fitting surface 16 is formed of a cylindrical surface centered on the central axis of the first element 8. That is, the pressed surface 7, the inner diameter side fitting surface 15, and the first bearing fitting surface 16 are disposed coaxially with each other.

The first side plate part 13 has a hollow circular end surface shape when viewed in the axial direction, and connects an end portion of the first large-diameter cylindrical part 11 on one side in the axial direction and an end portion of the first small-diameter cylindrical part 12 on the other side in the axial direction. That is, an end portion on a radially outer side of the first side plate part 13 is connected to the end portion of the first large-diameter cylindrical part 11 on one side in the axial direction, and an end portion on a radially inner side of the first side plate part 13 is connected to the end portion of the first small-diameter cylindrical part 12 on the other side in the axial direction.

The flange part 14 protrudes outward in the radial direction from an intermediate portion in the axial direction of the first large-diameter cylindrical part 11. The flange part 14 has through holes penetrating in the axial direction at a plurality of positions in the circumferential direction. In the present example, the flange part 14 has the through holes penetrating in the axial direction at eight positions in the circumferential direction.

The second element 9 includes a cylindrical second large-diameter cylindrical part 17, a cylindrical second small-diameter cylindrical part 18, a hollow circular flat plate-shaped second side plate part 19, and a plurality of attachment parts 20.

The second large-diameter cylindrical part 17 has an outer diameter side fitting surface 21 on an inner circumferential surface at a portion on one side in the axial direction. The outer diameter side fitting surface 21 is formed of a cylindrical surface centered on a central axis of the second element 9. The outer diameter side fitting surface 21 has an inner diameter dimension that allows it to fit into the inner diameter side fitting surface 15 of the first element 8 without rattling.

Also, the second large-diameter cylindrical part 17 has screw holes opening at an end surface on one side in the axial direction at a plurality of positions in the circumferential direction that match the through holes of the first element 8. In the present example, the second large-diameter cylindrical part 17 has screw holes opening at the end surface on one side in the axial direction at eight positions in the circumferential direction that match eight through holes provided in the first element 8.

The second small-diameter cylindrical part 18 is disposed coaxially with the second large-diameter cylindrical part 17 on the other side in the axial direction of the second large-diameter cylindrical part 17. The second small-diameter cylindrical part 18 has a second bearing fitting surface 22 in a portion from an end portion to an intermediate portion of an inner circumferential surface on one side in the axial direction. The second bearing fitting surface 22 is formed of a cylindrical surface with a central axis of the second element 9 as a center. That is, the outer diameter side fitting surface 21 and the second bearing fitting surface 22 are disposed coaxially with each other.

The second side plate part 19 has a hollow circular end surface shape when viewed in the axial direction, and connects an end portion of the second large-diameter cylindrical part 17 on the other side in the axial direction and an end portion of the second small-diameter cylindrical part 18 on one side in the axial direction. That is, an end portion on a radially outer side of the second side plate part 19 is connected to the end portion of the second large-diameter cylindrical part 17 on the other side in the axial direction, and an end portion on a radially inner side of the second side plate part 19 is connected to the end portion of the second small-diameter cylindrical part 18 on one side in the axial direction.

The attachment parts 20 are provided at a plurality of positions in the circumferential direction. In the present example, four attachment parts 20 are provided at regular intervals in the circumferential direction. The attachment parts 20 each have a protruding part 23 protruding outward in the radial direction from an outer circumferential surface of the second large-diameter cylindrical part 17, and an attachment hole 24 penetrating the protruding part 23 in the axial direction.

The pressed member 2 is formed by coupling and fixing the first element 8 and the second element 9 by fitting the inner diameter side fitting surface 15 of the first element 8 to the outer diameter side fitting surface 21 of the second element 9 without rattling, and screwing the connecting bolts 10 inserted through the through holes provided in the first element 8 into the screw holes provided in the second element 9 and further fastening them in a state in which the side surface on the other side in the axial direction of the flange part 14 of the first element 8 is brought in contact with the end surface on one side in the axial direction of the second large-diameter cylindrical part 17 of the second element 9.

In the present example, the inner diameter side fitting surface 15 and the first bearing fitting surface 16 of the first element 8 are disposed coaxially with each other, and the outer diameter side fitting surface 21 and the second bearing fitting surface 22 of the second element 9 are disposed coaxially with each other. Therefore, the first bearing fitting surface 16 and the second bearing fitting surface 22 are disposed coaxially with each other in an assembled state of the pressed member 2 in which the inner diameter side fitting surface 15 and the outer diameter side fitting surface 21 are fitted without rattling.

The input member 3 is connected to an input side mechanism such as an electric motor to receive the rotational torque. The input member 3 includes a base plate part 25, an input shaft part (input shaft) 26, and a pair of input side engaging parts 27a and 27b (a first input side engaging part 27a and a second input side engaging part 27b).

The base plate part 25 has a substantially circular end surface shape when viewed from the axial direction.

The input shaft part 26 protrudes in the axial direction from a central portion of a surface of the base plate part 25 on one side in the axial direction toward one side in the axial direction. The input shaft part 26 has a shank part 28a for being connected to an output part of the input side mechanism to be able to transmit a torque at a portion on one side in the axial direction. In the present example, the shank part 28a has a width across flat shape which has a pair of flat surfaces parallel to each other on an outer circumferential surface. However, the shank part can have any shape as long as it can be connected to the output part of the input side mechanism to be able to transmit a torque.

In the present example, the pair of input side engaging parts (engaging protrusions) 27a and 27b protrude in the axial direction toward the other side in the axial direction from portions deviated outward in the radial direction from a rotation center (central axis) O on a surface on the other side of the base plate part 25 in the axial direction. The input side engaging parts 27a and 27b are disposed at two positions on opposite sides in the radial direction on the surface on the other side of the base plate part 25 in the axial direction, and are separated from each other in the radial direction of the input member 3. The first input side engaging part (first engaging protrusion) 27a and the second input side engaging part (second engaging protrusion) 27b are disposed apart from each other in a first radial direction with a central axis of the input shaft part 26 interposed therebetween.

In the present example, the input side engaging parts 27a and 27b are symmetrical in the circumferential direction when viewed from the axial direction, and have a substantially fan-shaped or substantially trapezoidal end surface shape in which a circumferential width increases toward an outer side in the radial direction. Radial inner surfaces 27a1 and 27b1 of the input side engaging parts 27a and 27b are formed of flat surfaces parallel to each other. Radial outer surfaces 27a2 and 27b2 of the input side engaging parts 27a and 27b have a cylindrical surface-shaped outline shape corresponding to an outer circumferential surface of the base plate part 25. Also, a pair of circumferential side surfaces 27a3 and a pair of circumferential side surfaces 27b3 of the input side engaging parts 27a and 27b are formed of flat surfaces that are inclined in a direction away from each other toward an outer side in the radial direction.

In the present example, of the pair of input side engaging parts 27a and 27b, a width dimension (dimension in a left-right direction of FIGS. 3 and 5) of the first input side engaging part 27a (illustrated on an upper side in FIGS. 3 and 5 to 7) is smaller than a width dimension of the second input side engaging part 27b (illustrated on a lower side in FIGS. 3 and 5 to 7). That is, when viewed from the axial direction, a length dimension $L_{27A}$ of the radial inner surface 27a1 of the first input side engaging part 27a is smaller than a length dimension $L_{27B}$ of the radial inner surface 27b1 of the second input side engaging part 27b ($L_{27A} < L_{27B}$).

The input member 3 is rotatably supported by a radial inner side of the first element 8 of the pressed member 2. Specifically, a first bearing 29 is disposed between an outer circumferential surface of a portion on the other side in the axial direction of the input shaft part 26 and the first bearing fitting surface 16 of the first element 8, and thereby the input member 3 is rotatably supported with respect to the pressed member 2. With the input member 3 rotatably supported with respect to the pressed member 2, the input side engaging part 27 is disposed inward of the pressed surface 7 in the radial direction.

The output member 4 is connected to an output side mechanism such as a speed reduction mechanism to output the rotational torque. The output member 4 is disposed coaxially with the input member 3. In the present example, the output member 4 has an output shaft part (output shaft) 30 and an output side engaging part 31.

The output shaft part 30 has a flange part 32 protruding outward in the radial direction at an end portion on one side in the axial direction, and has a shank part 28b for being connected to an input part of the output side mechanism to be able to transmit a torque at a portion on the other side in the axial direction. In the present example, the shank part 28b has a bilateral width shape which has a pair of flat surfaces parallel to each other on an outer circumferential surface. However, the shank part can have any shape as long as it can be connected to the input part of the output side mechanism to be able to transmit a torque.

The output side engaging part 31 has a cam function. A distance from the rotation center (central axis) O of the output member 4 to an outer circumferential surface of the output side engaging part 31 is not constant in the circumferential direction. In the present example, the output side engaging part 31 has a substantially rectangular or substantially oval end surface shape when viewed from the axial direction, and protrudes from a central portion of an end surface on one side in the axial direction of the output shaft part 30 toward one side in the axial direction. The output side engaging part 31 has a pair of flat surfaces 31a parallel to each other on both side surfaces in a first radial direction (minor axis direction, vertical direction in FIGS. 3, 5, and 6), and has a pair of convex curved surfaces 31b each having a partially cylindrical surface shape on both side surfaces in a second radial direction (major axis direction, left-right direction in FIGS. 3, 5, and 6). Therefore, a distance from the rotation center O of the output member 4 to the outer circumferential surface of the output side engaging part 31 is not constant over the circumferential direction. Further, in the present example, the pair of convex curved surfaces 31b are each formed of a partial cylindrical surface with the rotation center O of the output member 4 as a center.

In the present example, the output side engaging part 31 is plane-symmetrical with respect to a virtual plane passing through the rotation center O of the output member 4 and orthogonal to the pair of flat surfaces 31a. Further, the output side engaging part 31 is plane-symmetrical with respect to a virtual plane passing through the rotation center O of the output member 4 and parallel to the pair of flat surfaces 31a. The output side engaging part 31 is disposed at a portion between the pair of input side engaging parts 27a and 27b. The output side engaging part 31 is disposed between the first input side engaging part 27a and the second input side engaging part 27b in the first radial direction (vertical direction in FIGS. 3, 5, and 6). Also, in the present example, in a cross section orthogonal to the rotation center O of the output member 4, a length dimension $L_{31}$ (dimension in the left-right direction in FIGS. 3, 5, and 6) in the second radial direction of the pair of flat surfaces 31a, which are side surfaces on both sides in the first radial direction, is larger than the length dimension $L_{27A}$ of the radial inner surface 27a1 of the first input side engaging part 27a and is smaller than the length dimension $L_{27B}$ of the radial inner surface 27b1 of the second input side engaging part 27b ($L_{27A} < L_{31} < L_{27B}$).

The output member 4 is rotatably supported by a radial inner side of the second element 9 of the pressed member 2. Specifically, a second bearing 44 is disposed between an outer circumferential surface of a portion on one side in the axial direction of the output shaft part 30 and the second bearing fitting surface 22 of the second element 9, and thereby the output member 4 is rotatably supported with respect to the pressed member 2. With the output member 4 rotatably supported with respect to the pressed member 2, the output side engaging part 31 is disposed inward of the pressed surface 7 in the radial direction.

The pair of engagement elements 5a and 5b each include a pair of pressing surfaces (contact surfaces, engaging outer surfaces) 33, an input side engaged part 34, and an output side engaged part 35. In the present example, the engagement elements 5a and 5b have a substantially semicircular end surface shape when viewed from the axial direction, and have shapes that are symmetrical to each other with respect to a width direction (direction indicated by an arrow B in FIG. 5 (second radial direction)). In the present example, the pair of engagement elements 5a and 5b are made to have different reference signs for convenience of explanation, but they have substantially the same shape. In another example, the pair of engagement elements 5a and 5b can have shapes different from each other.

Figure 5:
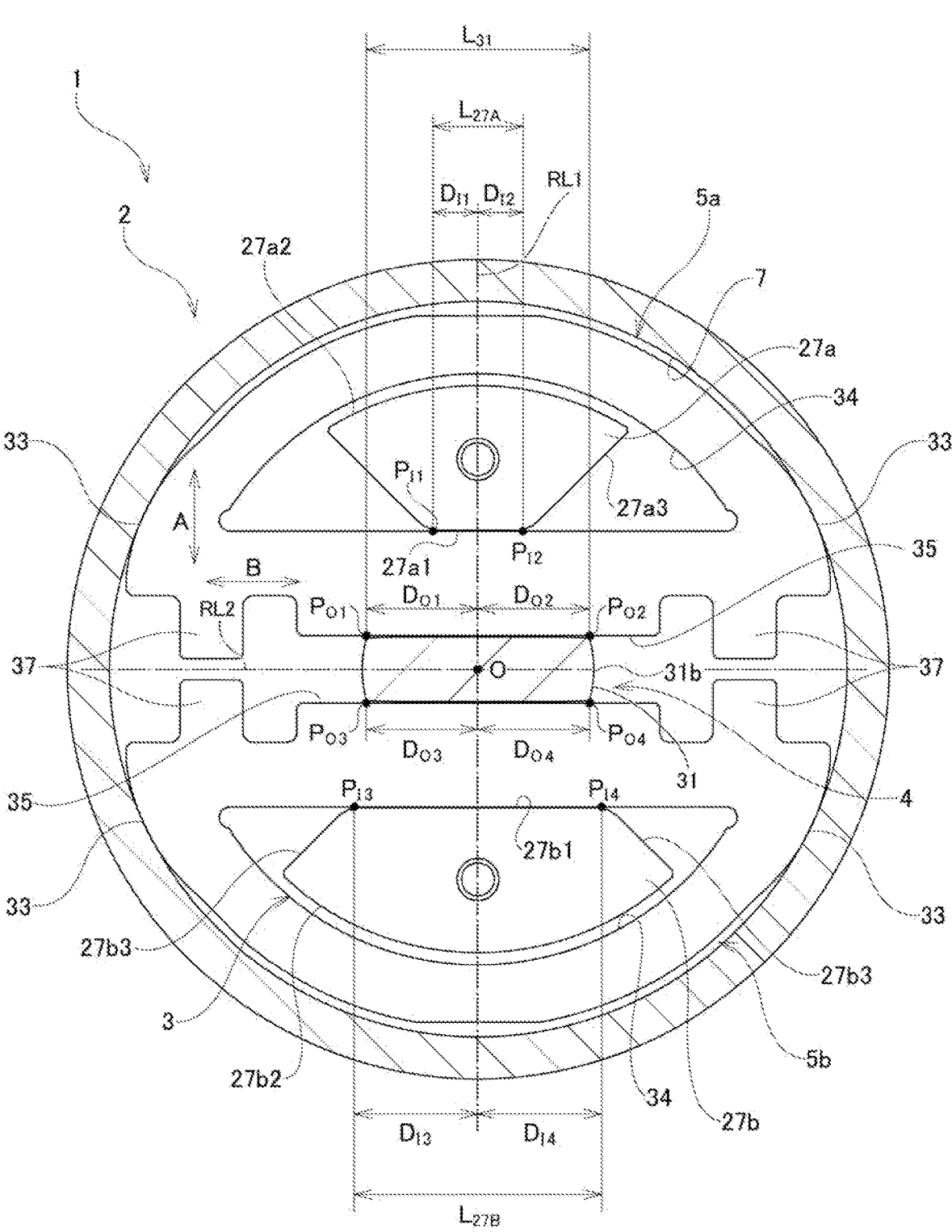
FIG. 5 is a view schematically illustrating a cross section along line B-B of FIG. 2 for explaining a dimensional relationship of each part.

A radial direction of each of the engagement elements 5a and 5b refers to the direction indicated by an arrow A in FIG. 5, and a width direction for each engagement element 5a and 5b refers to the direction indicated by the arrow B in FIG. 5. In the present example, the radial direction of each of the engagement elements 5a and 5b is a separating and approaching direction of the pressing surface 33 with respect to the pressed surface 7 and corresponds to a first direction (first radial direction), and the width direction of each of the engagement elements 5a and 5b corresponds to a second direction (second radial direction) orthogonal to both the first direction and the axial direction of the input member 3.

The pair of pressing surfaces 33 are provided at two positions spaced apart from each other in the circumferential direction on the radial outer surfaces of the engagement elements 5a and 5b facing the pressed surface 7. In one example, the pressing surfaces 33 are each formed of a partially cylindrical surface-shaped convex curved surface having a radius of curvature smaller than a radius of curvature of the pressed surface 7. Further, a portion of the radial outer surface of each of the engagement elements 5a and 5b deviated from the pair of pressing surfaces 33 in the circumferential direction is located radially inwards from a virtual circle; the virtual circle is centered on the central axis O of the input member 3 and in contact with the pair of pressing surfaces 33 when viewed in the axial direction. That is, in one example, with the pair of pressing surfaces 33 in contact with the pressed surface 7, a portion of the radial outer surface of each of the engagement elements 5a and 5b deviated from the pair of pressing surfaces 33 in the circumferential direction is not in contact with the pressed surface 7.

In one example, each of the pressing surfaces 33 can have a surface property that has a larger frictional coefficient with respect to the pressed surface 7 than the other portion in the engagement elements 5a and 5b. Also, each pressing surface 33 can be formed integrally with another portion (main body) of the engagement elements 5a and 5b. In another example, the pressing surface 33 can be formed on a surface of another member provided in the main bodies of the engagement elements 5a and 5b (for example, a friction material fixed to the main body by affixing or adhering).

The input side engaged part 34 is provided at a radially intermediate portion of a central portion in the width direction of the engagement elements 5a and 5b. In the present example, the input side engaged part 34 is formed of a through hole having a substantially arcuate opening shape when viewed in the axial direction and axially penetrating a radially intermediate portion of a central position in the width direction of the engagement elements 5a and 5b, and has an inner surface facing the through hole. The through hole of the input side engaged part 34 has a size through which the input side engaging parts 27a and 27b can be loosely inserted. In a state in which the input side engaging parts 27a and 27b are inserted inside the input side engaged part 34, there are gaps in the width direction and radial direction of the engagement elements 5a and 5b between the input side engaging parts 27a and 27b and an inner surface of the input side engaged part 34. Therefore, the input side engaging part 27 can be displaced with respect to the input side engaged part 34 in a rotation direction of the input member 3. The engagement elements 5a and 5b are disposed to be able to change a position and/or a posture thereof. For example, the input side engaged part 34 can be displaced in the radial direction of the engagement elements 5a and 5b with respect to the input side engaging parts 27a and 27b. In the present example, the input side engaged part 34 has a parallel flat surface 34a on a surface facing outward in the radial direction and a partially cylindrical surface-shaped concave curved surface 34b on a surface facing inward in the radial direction.

In another example, the input side engaged part can be formed of a bottomed hole that opens only at a surface on one side in the axial direction of the engagement element. In still another example, the input side engaged part can be formed of a notch that opens at an outer surface in the radial direction of the engagement element.

The output side engaged part 35 is provided at a central portion in the width direction of radial inner surfaces of the engagement elements 5a and 5b. In the present example, the output side engaged part 35 is formed of a flat surface. Further, in the present example, a dimension in a width direction of the output side engaged part 35 is larger than a dimension in a width direction of the flat surface 31a of the output side engaging part 31.

The engagement elements 5a and 5b each have a pair of protruding parts 37 protruding inward in the radial direction at two positions sandwiching the output side engaged part 35 in the width direction.

In the reverse input cutoff clutch 1 of the present example, the engagement elements 5a and 5b are disposed to be aligned in the first direction inside the pressed member 2. The pressing surface 33 of the first engagement element 5a and the pressing surface 33 of the second engagement element 5b are directed to opposite sides from each other in the radial direction. A radial inner surface of the first engagement element 5a and a radial inner surface of the second engagement element 5b are directed to the central axis O to face each other. The engagement elements 5a and 5b are disposed to be movable independently of each other in the radial direction (for example, in the first direction). The pair of input side engaging parts 27a and 27b of the input member 3 disposed on one side in the axial direction are axially inserted into holes of the input side engaged parts 34 of the engagement elements 5a and 5b. The output side engaging part 31 of the output member 4 disposed on the other side in the axial direction is axially inserted into a gap between the output side engaged parts 35 of the engagement elements 5a and 5b. That is, the pair of engagement elements 5a and 5b are separately disposed outward of the output side engaging part 31 in the radial direction. The output side engaging part 31 is disposed to be sandwiched between the output side engaged parts 35 of the engagement elements 5a and 5b.

In the present example, in a state in which the pair of engagement elements 5a and 5b are disposed inward of the pressed member 2 in the radial direction, an inner diameter dimension of the pressed member 2 and radial dimensions of the engagement elements 5a and 5b are set so that a gap is present in at least one of a portion between the pressed surface 7 and the pair of pressing surfaces 33 and a portion between distal end surfaces of the protruding parts 37.

The biasing member 6 elastically biases each of the engagement elements 5a and 5b outward in the radial direction (a direction in which the pair of pressing surfaces 33 approach the pressed surface 7 in the first direction). The reverse input cutoff clutch 1 of the present example includes two biasing members 6. Each of the biasing members 6 is disposed between the radial inner surfaces of the pair of engagement elements 5a and 5b. In one example, each biasing member 6 is constituted by a compression coil spring. Each biasing member 6 is sandwiched between the radial inner surfaces of the pair of engagement elements 5a and 5b with it elastically compressed. The pair of engagement elements 5a and 5b are elastically biased by the two biasing members 6 in a direction away from each other in the first direction. Thereby, in a neutral state in which a torque is not applied to either the input member 3 or the output member 4, the pair of pressing surfaces 33 of each of the engagement elements 5a and 5b come into contact with the pressed surface 7. In another example, the reverse input cutoff clutch 1 can include the biasing member 6 having different functions, shapes, and/or numbers from those described above. In still another example, the reverse input cutoff clutch 1 can have a configuration in which the biasing member 6 is substantially omitted.

In the present example, the protruding parts 37 of the engagement elements 5*a* and 5*b* are each inserted into an inner side of end portions on both sides of the biasing member 6 in a length direction, and thereby the biasing member 6 is prevented from coming off from between the engagement elements 5.

Further, the reverse input cutoff clutch 1 of the present example includes a support member 45 that bridges distal end portions (end portions on the other side in the axial direction) of the pair of input side engaging parts 27*a* and 27*b* of the input member 3.

Figure 4:
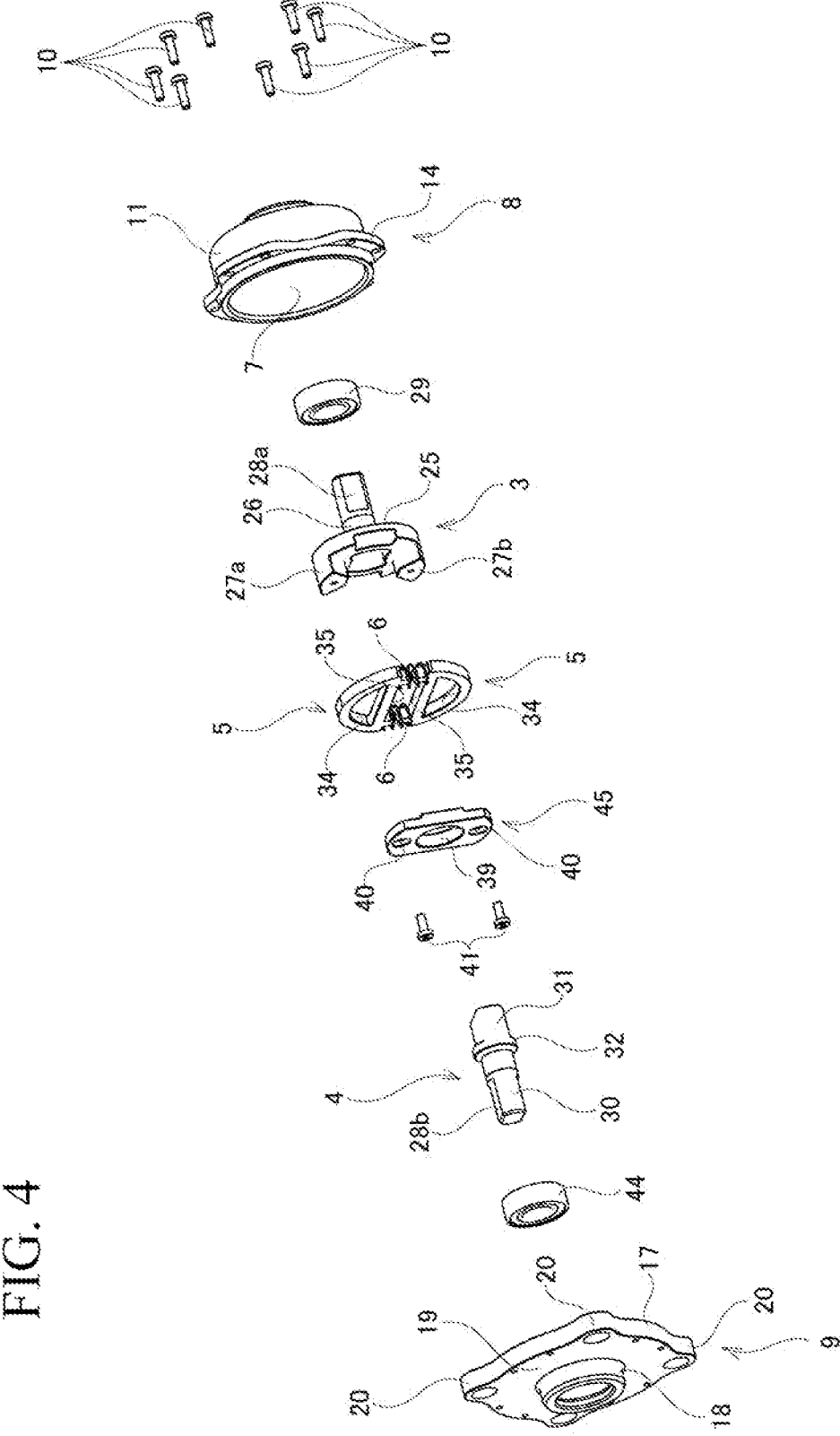
FIG. 4 is an exploded perspective view illustrating the reverse input cutoff clutch.

As illustrated in FIG. 4, the support member 45 has a substantially oval or substantially rectangular end surface shape when viewed from the axial direction. The support member 45 has a large-diameter through hole 39 through which the output side engaging part 31 of the output member 4 is inserted at a central portion thereof, and has two small-diameter through holes 40 on opposite sides of the large-diameter through hole 39 that is sandwiched in a major axis direction. When a support bolt 41 inserted through each of the small-diameter through holes 40 is screwed into a screw hole 42 that opens at an end surface on the other side in the axial direction of each of the input side engaging parts 27*a* and 27*b*, the support member 45 is supported and fixed to bridge the pair of input side engaging parts 27*a* and 27*b*. In another example, the reverse input cutoff clutch 1 can include the support member 45 having different functions, shapes, and/or numbers from those described above. In still another example, the reverse input cutoff clutch 1 can have a configuration in which the support member 45 is substantially omitted.

<Explanation of Operation of Reverse Input Cutoff Clutch>

An operation of the reverse input cutoff clutch 1 of the present example will be described with reference to FIGS. 6 and 7.

First, a case in which a rotational torque is input to the input member 3 from the input side mechanism will be described.

Figure 6:
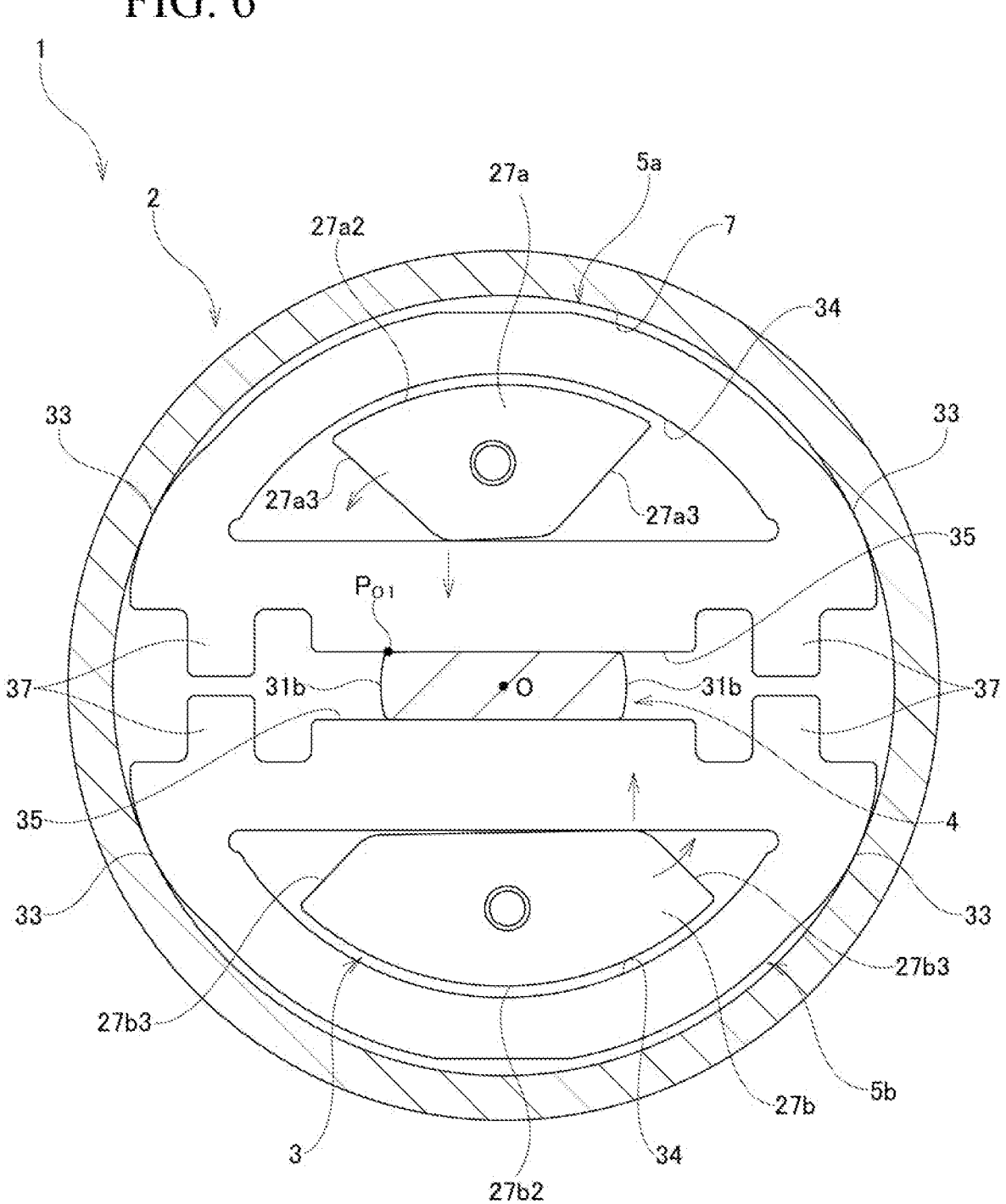
FIG. 6 is a view similar to FIG. 5, illustrating a state in which a rotational torque is input to an input member.

As illustrated in FIG. 6, when a rotational torque is input to the input member 3, the input side engaging parts 27*a* and 27*b* move (rotate) in a rotation direction (circumferential direction, the counterclockwise direction in the example of FIG. 6) of the input member 3 inside the input side engaged parts 34 of the engagement elements 5*a* and 5*b*. As a result, the flat surfaces 34*a* of the input side engaged parts 34 of the engagement elements 5*a* and 5*b* are pressed inward in the radial direction by the radial inner surfaces 27*a*1 and 27*b*1 of the input side engaging parts 27*a* and 27*b*, and the pressing surfaces 33 of each of the engagement elements 5*a* and 5*b* move in a direction away from the pressed surface 7. That is, the engagement elements 5*a* and 5*b* move inward in the radial direction, which is a direction toward each other, (the engagement element 5*a* on an upper side in FIG. 6 moves downward, and the engagement element 5*b* on a lower side in FIG. 6 moves upward) on the basis of the engagement with the input member 3. Thereby, the radial inner surfaces of the pair of engagement elements 5*a* and 5*b* move toward each other, and the output side engaging part 31 of the output member 4 is sandwiched by the output side engaged parts 35 of the engagement elements 5*a* and 5*b* from both sides in the radial direction. For example, the output member 4 rotates so that the flat surfaces 31*a* of the output side engaging part 31 are parallel to the output side engaged parts 35 of the engagement elements 5*a* and 5*b*, and the output side engaging part 31 engages (comes into contact) with the output side engaged parts 35 of the engagement elements 5*a* and 5*b* substantially without rattling. As a result, the rotational torque input to the input member 3 is transmitted to the output member 4 via the pair of engagement elements 5*a* and 5*b*, and is output from the output member 4.

In the reverse input cutoff clutch 1 of the present example, when the rotational torque is input to the input member 3, the pair of engagement elements 5*a* and 5*b* move in a direction away from the pressed surface 7 regardless of the rotation direction of the input member 3. Then, the rotational torque input to the input member 3 is transmitted to the output member 4 via the pair of engagement elements 5*a* and 5*b*.

Next, a case in which the rotational torque is reversely input to the output member 4 from the output side mechanism will be described.

Figure 7:
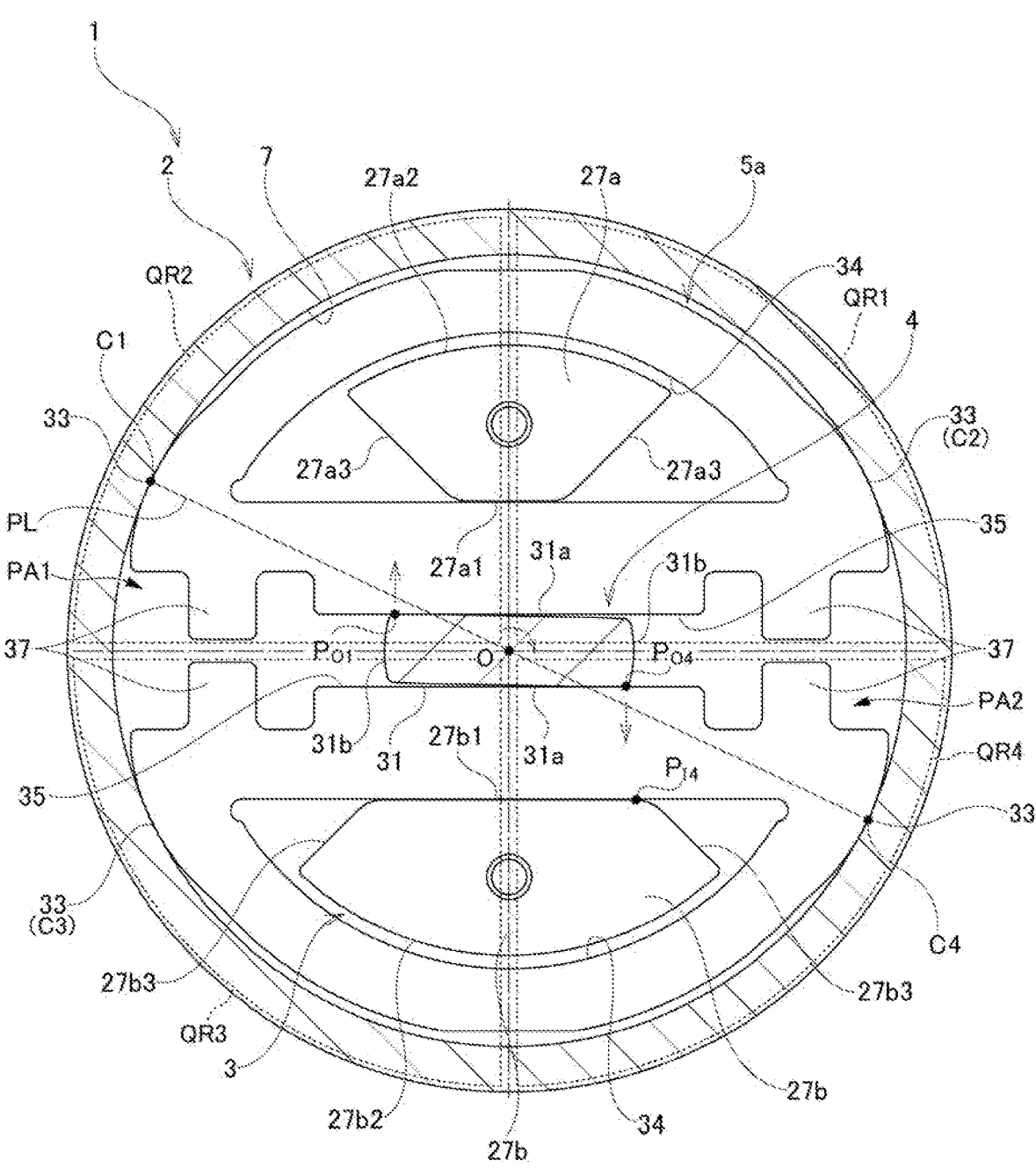
FIG. 7 is a view similar to FIG. 5, illustrating a state in which a rotational torque is reversely input to an output member.
Figure 8:
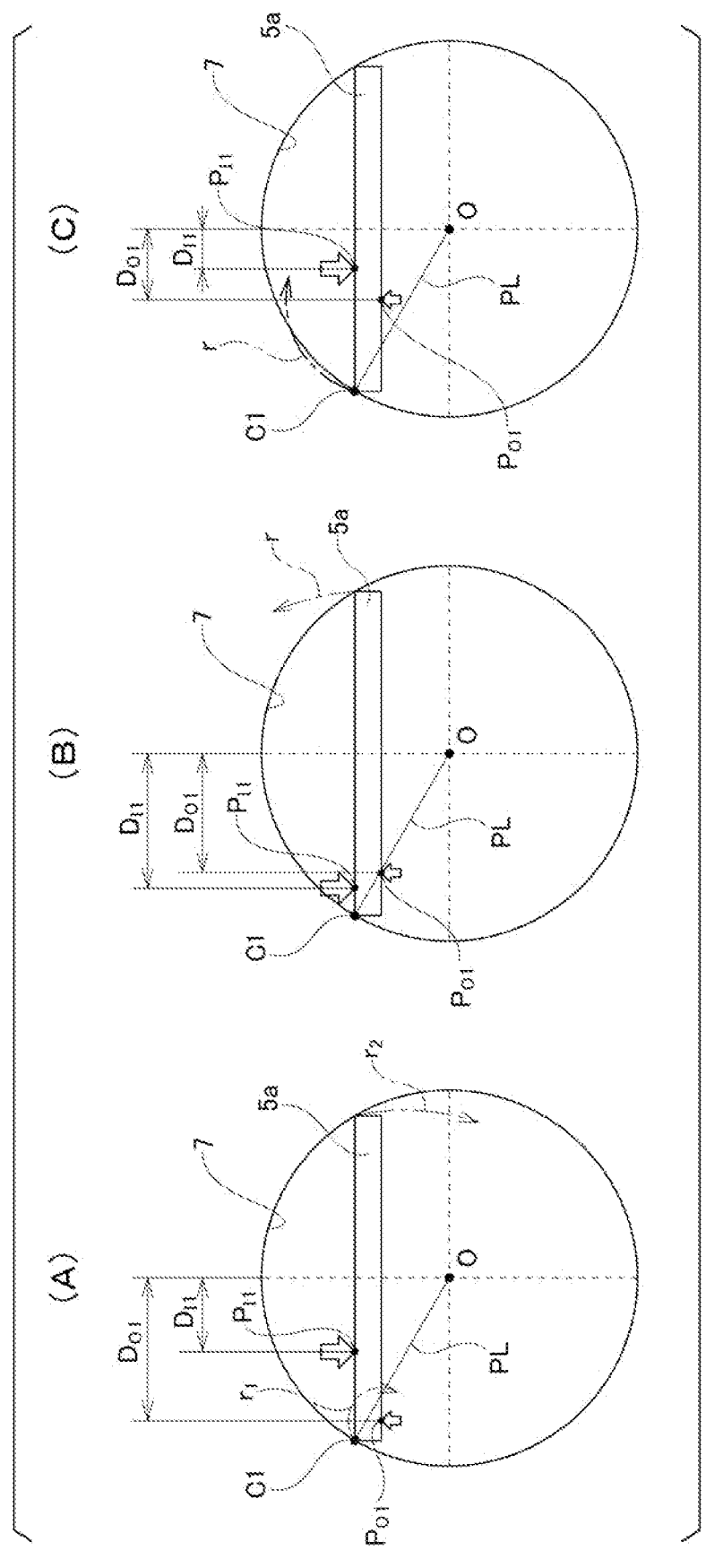
FIG. 8 is a schematic view for explaining effects when a size and a shape of each part are restricted.

As illustrated in FIG. 7, when the rotational torque is reversely input to the output member 4, the output side engaging part 31 rotates in a rotation direction (the clockwise direction in the example of FIG. 7) of the output member 4 between the output side engaged part 35 of the first engagement element 5*a* and the output side engaged part 35 of the second engagement element 5*b*. Then, due to connection portions (for example, corner portions) between the flat surfaces 31*a* and the convex curved surfaces 31*b* on the outer circumferential surface of the output side engaging part 31, the output side engaged parts 35 of the pair of engagement elements 5*a* and 5*b* are pressed outward in the radial direction, and the engagement elements 5*a* and 5*b* move in a direction toward the pressed surface 7. That is, the pair of engagement elements 5*a* and 5*b* move outward in the radial direction, which is a direction away from each other (the engagement element 5*a* on an upper side in FIG. 7 moves upward, and the engagement element 5*b* on a lower side in FIG. 7 moves downward) on the basis of the engagement with the output member 4. Thereby, the pair of pressing surfaces 33 of each of the engagement elements 5*a* and 5*b* are frictionally engaged with the pressed surface 7.

As a result, the rotational torque reversely input to the output member 4 is completely cut off and is not transmitted to the input member 3, or a part of the rotational torque reversely input to the output member 4 is transmitted to the input member 3 and the rest is cut off. In a state in which the pair of engagement elements 5*a* and 5*b* are stretched (clamped) between the output side engaging part 31 and the pressed member 2 such that the pressing surfaces 33 do not slide (rotate relatively) with respect to the pressed surface 7, the output member 4 is locked, and the rotational torque reversely input to the output member 4 is completely cut off and is not transmitted to the input member 3. In a state in which the pair of engagement elements 5*a* and 5*b* are stretched (clamped) between the output side engaging part 31 and the pressed member 2 such that the pressing surfaces 33 slide with respect to the pressed surface 7, the output member 4 is half-locked (partially locked), a part of the rotational torque reversely input to the output member 4 is transmitted to the input member 3, and the rest is cut off.

In the reverse input cutoff clutch 1 of the present example, sizes of gaps between the constituent members, or the like are adjusted so that the above-described operation can be appropriately performed. Particularly, each constituent member is designed so that a positional relationship between the constituent members is appropriate when the pressing surfaces 33 of each of the pair of engagement elements 5*a* and 5*b* come into contact with the pressed surface 7.

In one example, when the pressing surfaces 33 of each of the pair of engagement elements 5a and 5b come into contact with the pressed surface 7, there is a predetermined gap between the radial inner surface 27a1 of the input side engaging part 27 and the inner surface of the input side engaged part 34. In this case, when a corner portion of the output side engaging part 31 presses the output side engaged part 35, there is a gap that allows each of the pressing surfaces 33 to press further toward the pressed surface 7. An appropriate design prevents radially outward movement of the engagement elements 5a and 5b from being hindered by the input side engaging parts 27a and 27b when the rotational torque is reversely input to the output member 4. Also, even after each pressing surface 33 is in contact with the pressed surface 7, a surface pressure acting on a contact part between each pressing surface 33 and the pressed surface 7 changes according to a magnitude of the rotational torque reversely input to the output member 4. That is, locking or half-locking of the output member 4 is properly performed.

In the reverse input cutoff clutch 1 of the present example, dimensions and shapes of the pressed member 2, the input member 3, the output member 4, and the engagement elements 5a and 5b are set to satisfy the following relationship.

In the reverse input cutoff clutch 1 of the present example, the first input side engaging part 27a includes a first contact part $P_{I1}$ and a second contact part $P_{I2}$ that can come into contact with the first engagement element 5a when a rotational torque is input to the input member 3. The first contact part $P_{I1}$ and the second contact part Pu are disposed apart from each other in a second direction (second radial direction) orthogonal to the first direction (first radial direction). The second input side engaging part 27b has a third contact part PB and a fourth contact part $P_{I4}$ that can come into contact with the second engagement element 5b when the rotational torque is input to the input member 3. The third contact part $P_{I3}$ and the fourth contact part $P_{I4}$ are disposed apart from each other in the second direction. The output side engaging part 31 has a fifth contact part $P_{O1}$ and a sixth contact part $P_{O2}$ that can come into contact with the first engagement element 5a when the rotational torque is input to the output member 4. The fifth contact part $P_{O1}$ and the sixth contact part $P_{O2}$ are disposed apart from each other in the second direction. Also, the output side engaging part 31 has a seventh contact part $P_{O3}$ and an eighth contact part $P_{O4}$ that can come into contact with the second engagement element 5b when the rotational torque is input to the output member 4. The seventh contact part $P_{O3}$ and the eighth contact part $P_{O4}$ are disposed apart from each other in the second direction. A first group including the first contact part $P_{I1}$ and the second contact part $P_{I2}$ and a second group including the third contact part $P_{I3}$ and the fourth contact part $P_{I4}$ are disposed apart from each other with a second reference lines RL2 passing through the central axis O and parallel to the second direction interposed therebetween. The two contact parts $P_{I1}$ and $P_{I2}$ of the first group are respectively disposed closer to a first reference line RL1 than the fifth contact part Pot and the sixth contact part $P_{O2}$ are. The two contact parts $P_{I3}$ and $P_{I4}$ of the second group are respectively disposed farther from the first reference line RL1 than the seventh contact part $P_{O3}$ and the eighth contact part $P_{O4}$ are.

In the reverse input cutoff clutch 1 of the present example, as the input member 3 rotates, the pair of input side engaging parts 27a and 27b come into contact with the input side engaged parts 34 of the pair of engagement elements 5a and 5b. As illustrated in FIGS. 5 and 6, in rotation of the input member 3 in one direction, the input side engaging parts 27a and 27b of the input member 3 come into contact with the engagement elements 5a and 5b at the first contact part Pu and the fourth contact part $P_{I}$a. In rotation of the input member 3 in an opposite direction, the input side engaging parts 27a and 27b come into contact with the engagement elements 5a and 5b at the second contact part $P_{I2}$ and the third contact part $P_{I3}$. On the other hand, as the output member 4 rotates, the output side engaging part 31 comes into contact with the output side engaged parts 35 of the pair of engagement elements 5a and 5b, and the pair of pressing surfaces 33 of each of the engagement elements 5a and 5b are pressed against the pressed surface 7. As illustrated in FIGS. 5 and 7, in rotation of the output member 4 in one direction, the output side engaging part 31 of the output member 4 comes into contact with the engagement elements 5a and 5b at the fifth contact part $P_{O1}$ and the eighth contact part $P_{O4}$. In rotation of the output member 4 in the opposite direction, the output side engaging part 31 comes into contact with the engagement elements 5a and 5b at the sixth contact part $P_{O2}$ and the seventh contact part $P_{O3}$. A distance in the second direction between the input side contact part $P_{I1}$ ($P_{I2}$) which is one of the two input side contact parts $P_{I1}$ and $P_{I4}$ ($P_{I2}$ and $P_{I3}$) serving as contact parts between the input side engaging parts 27a and 27b and the input side engaged parts 34 of the engagement elements 5a and 5b, and the rotation center O of the input member 3 is defined as a distance $D_{I1}$ ($D_{I2}$). A distance in the second direction between the output side contact part $P_{O1}$ ($P_{O2}$), which is one of the two output side contact parts $P_{O1}$ and $P_{O4}$ ($P_{O2}$ and $P_{O3}$) serving as contact parts between the output side engaging part 31 and the output side engaged parts 35 of the engagement elements 5a and 5b, on a side closer to one input side contact part $P_{I1}$ ($P_{I2}$) in the second direction, and the rotation center O of the output member 4 is defined as a distance $D_{O1}$ ($D_{O2}$). At this time, the distance $D_{I1}$ ($D_{I2}$) is smaller than the distance $D_{O1}$ ($D_{O2}$) ($D_{I1} < D_{O1}$ and $D_{I2} < D_{O2}$). A distance in the second direction between the other input side contact part $P_{I4}$ ($P_{I3}$) of the two input side contact parts $P_{I1}$ and $P_{I4}$ ($P_{I2}$ and $P_{I3}$) and the rotation center O of the input member 3 is defined as a distance $D_{I4}$ ($D_{I3}$). A distance in the second direction between the output side contact part $P_{O4}$ ($P_{O3}$), which is the other of the two output side contact parts $P_{O1}$ and $P_{O4}$ ($P_{O2}$ and $P_{O3}$), on a side closer to the other input side contact part $P_{I4}$ ($P_{I3}$) in the second direction, and the rotation center O of the output member 4 is defined as a distance $D_{O4}$ ($D_{O3}$). At this time, the distance $D_{I4}$ ($D_{I3}$) is larger than the distance $D_{O4}$ ($D_{O3}$) ($D_{I4} > D_{O4}$ and $D_{I3} > D_{O3}$).

As a distance in the second direction from the first reference line RL1, the first contact part $P_{I1}$, the second contact part $P_{I2}$, the third contact part $P_{I3}$, the fourth contact part $P_{I4}$, the fifth contact part $P_{O1}$, the sixth contact part $P_{O2}$, the seventh contact part $P_{O1}$, and the eighth contact part $P_{O4}$ respectively have the first distance $D_{I1}$, the second distance $D_{I2}$, the third distance $D_{I3}$, the fourth distance $D_{I4}$, the fifth distance $D_{O1}$, the sixth distance $D_{O2}$, the seventh distance $D_{O3}$, and the eighth distance $D_{O4}$. In the present example, the first distance $D_{I1}$ and the second distance $D_{I2}$ are respectively smaller than the fifth distance $D_{O1}$ and the sixth distance $D_{O2}$, and the third distance $D_{I3}$ and the fourth distance $D_{I4}$ are respectively larger than the seventh distance $D_{O3}$ and the eighth distance $D_{O4}$.

In the present example, the length dimension $L_{31}$ of the pair of flat surfaces 31a which are side surfaces on both sides in the minor axis direction of the output side engaging part 31 is larger than the length dimension $L_{27A}$ of the radial inner surface $27_{a1}$ of the first input side engaging part 27a (upper side in FIGS. 3 and 5 to 7) among the pair of input side engaging parts 27a and 27b, and smaller than the length dimension $L_{27B}$ of the radial inner surface 27b1 of the second input side engaging part 27b (lower side in FIGS. 3 and 5 to 7) among the pair of input side engaging parts 27a and 27b.

In the present example, in a plan view perpendicular to the central axis O, the first contact part $P_{I1}$ and the third contact part $P_{I3}$, and the second contact part $P_{I2}$ and the fourth contact part $P_{I4}$ are positioned substantially symmetrically with respect to the first reference line RL1, respectively. Also, in a plan view perpendicular to the central axis O, the first contact part $P_{I1}$ and the second contact part $P_{I2}$, and the third contact part $P_{I3}$ and the fourth contact part $P_{I4}$ are positioned substantially asymmetrically with respect to the second reference line RL2, respectively. Also, in a plan view perpendicular to the central axis O, the fifth contact part $P_{O1}$ and the seventh contact part $P_{O3}$, and the sixth contact part $P_{O2}$ and the eighth contact part Pot are positioned substantially symmetrically with respect to the first reference line RL1, respectively. Also, the fifth contact part $P_{O1}$ and the sixth contact part $P_{O2}$, and the seventh contact part $P_{O1}$ and the eighth contact part $P_{O4}$ are positioned substantially symmetrically with respect to the second reference line RL2, respectively.

In the present example, the output side engaging part 31 is plane-symmetrical with respect to a virtual plane passing through the rotation center O of the output member 4 and orthogonal to the pair of flat surfaces 31a, and is plane-symmetrical with respect to a virtual plane passing through the rotation center O of the output member 4 and parallel to the pair of flat surfaces 31a. Therefore, regardless of the rotation direction of the output member 4, the fifth distance $D_{O1}$ and the sixth distance $D_{O2}$ (i.e., a distance in the second direction between the output side contact parts $P_{O1}$ and $P_{O2}$ and the rotation center O of the output member 4; the output side contact parts $P_{O1}$ and $P_{O2}$ are contact parts between the output side engaged part 35 of the first engagement element 5a (upper side in FIGS. 3 and 5 to 7) among the pair of engagement elements 5a and 5b and the output side engaging part 31) and the seventh distance $D_{O3}$ and the eighth distance $D_{O4}$ (i.e., a distance in the second direction between the output side contact parts $P_{O3}$ and $P_{O4}$ and the rotation center O of the output member 4; the output side contact parts $P_{O3}$ and $P_{O4}$ are contact parts between the output side engaged part 35 of the second engagement element 5b (lower side in FIGS. 3 and 5 to 7) among the pair of engagement elements 5a and 5b and the output side engaging part 31) are equal to each other.

In the present example, the first distance $D_{I1}$ and the second distance $D_{I2}$ are substantially the same, the third distance $D_{I3}$ and the fourth distance $D_{I4}$ are substantially the same, and the first distance $D_{I1}$ and the second distance $D_{I2}$ are different from the third distance $D_{I3}$ and the fourth distance $D_{I4}$, respectively. Also, the fifth distance $D_{O1}$ and the sixth distance $D_{O2}$ are substantially the same, and the seventh distance $D_{O3}$ and the eighth distance $D_{O4}$ are substantially the same. In the present example, $D_{I1}=D_{I2}<D_{I3}=D_{I4}$, and $D_{O1}=D_{O2}=D_{O3}=D_{O4}$. Also, $D_{I1}=D_{I2}<D_{O1}=D_{O2}$, and $D_{I3}=D_{I4}>D_{O3}=D_{O4}$.

In the present example, as illustrated in FIG. 7, the first engagement element 5a has a ninth contact part C1 and a tenth contact part C2 that can come into contact with the inner wall surface 7 of the pressed member 2 when a rotational torque is input to the output member 4. The ninth contact part C1 and the tenth contact part C2 are disposed apart from each other in the second direction. The second engagement element 5b has an eleventh contact part C3 and a twelfth contact part C4 that can come into contact with the inner wall surface 7 of the pressed member 2 when a rotational torque is input to the output member 4. The eleventh contact part C3 and the twelfth contact part C4 are disposed apart from each other in the second direction. In at least one of four quadrants (a first quadrant QR1, a second quadrant QR2, a third quadrant QR3, and a fourth quadrant QR4) divided by the first reference line RL1 and the second reference line RL2, when a rotational torque is input to the output member 4, one of the fifth contact part $P_{O1}$, the sixth contact part $P_{O2}$, the seventh contact part $P_{O3}$, and the eighth contact part $P_{O4}$ is disposed in a region between the second reference line RL2 and a virtual straight line PL connecting one of the ninth contact part C1, the tenth contact part C2, the eleventh contact part C3, and the twelfth contact part C4, and the central axis O. In the example of FIG. 7, when a rotational torque is input to the output member 4, the fifth contact part $P_{O1}$ and the eighth contact part $P_{O4}$ are respectively disposed in regions between the second reference line RL2 and the virtual straight line PL in the two quadrants QR2 and QR4 that are in a positional relationship diagonally opposite to each other among the four quadrants.

In the present example, in a locked state illustrated in FIG. 7, for each of the pair of engagement elements 5a and 5b, the rotational torque is reversely input to the output member 4, and the pressing surfaces 33 of each of the engagement elements 5a and 5b are in contact with the pressed surface 7. In this locked state, in the second quadrant QR2, the fifth contact part $P_{O1}$ is positioned on a side closer to the rotation center O of the output member 4 in the first direction than the virtual straight line PL connecting the ninth contact part C1 (contact part) and the rotation center O of the output member 4; and in the fourth quadrant QR4, the eighth contact part $P_{O4}$ is positioned on a side closer to the rotation center O of the output member 4 in the first direction than the virtual straight line PL connecting the twelfth contact part C4 (contact part) and the rotation center O of the output member 4. The ninth contact part C1 is a contact part between the pressing surface 33 (the pressing surface 33 on a left side of the engagement element 5a on an upper side in the example of FIG. 7) on a side closer to the fifth contact part $P_{O1}$ than the rotation center O of the output member 4 in the second direction, and the pressed surface 7. The twelfth contact part C4 is a contact part between the pressing surface 33 (the pressing surface 33 on a left side of the engagement element 5b on a lower side in the example of FIG. 7) on a side closer to the eighth contact part $P_{O4}$ than the rotation center O of the output member 4 in the second direction, and the pressed surface 7.

According to the reverse input cutoff clutch 1 of the present example, an axial dimension can be made small and the number of parts can be reduced.

That is, in the reverse input cutoff clutch 1 of the present example, rotation of each of the input member 3 and the output member 4 is converted into radially inward or radially outward movement of the engagement elements 5a and 5b. The engagement elements 5a and 5b that have moved radially inward engage with the output member 4 positioned on a radially inner side of the engagement elements 5a and 5b. The engagement elements 5a and 5b that have moved radially outward are pressed against the pressed member 2 positioned on a radially outer side of the engagement elements 5a and 5b. As a result, on the basis of the radial movement of the engagement elements 5a and 5b, an unlocked state (including a half-unlocked state) of the output member 4 in which the rotational torque can be transmitted from the input member 3 to the output member 4 and a locked state in which rotation of the output member 4 is prevented or a half-locked state in which rotation of the output member 4 is suppressed are switched. Such a configuration is advantageous in reducing an axial dimension of an entire device of the reverse input cutoff clutch 1.

The engagement elements 5a and 5b are used as operation members for both a function of transmitting the rotational torque input to the input member 3 to the output member 4 and a function of locking or half-locking the output member 4. Therefore, this is advantageous in reducing the number of parts of the reverse input cutoff clutch 1 and stabilizing the operation. For example, if a different operation member is used for the function of transmitting the rotational torque and the function of locking or half-locking, there is a likelihood that a timing of unlocking or half-unlocking will deviate from a timing of starting transmission of the rotational torque. For example, if the rotational torque is reversely input to the output member between unlocking or half-unlocking and the start of transmission of the rotational torque, the output member may be locked or half-locked again. In the present example, since the operation member common to a plurality of functions is used, such inconvenience is prevented.

Also, in the present example, a direction of a force acting from the input member 3 on the engagement elements 5a and 5b is opposite to a direction of a force acting from the output member 4 on the engagement elements 5a and 5b. Therefore, set values of the elements related to each functions can be adjusted independently. For example, a magnitude relation between the both forces is set, and movement of the engagement elements 5a and 5b is appropriately controlled. Therefore, the switching operation between the locked state and the unlocked state of the output member 4 can be performed stably and reliably.

Particularly, according to the reverse input cutoff clutch 1 of the present example, it is possible to achieve both the locking performance and the unlocking performance.

Figure 11:
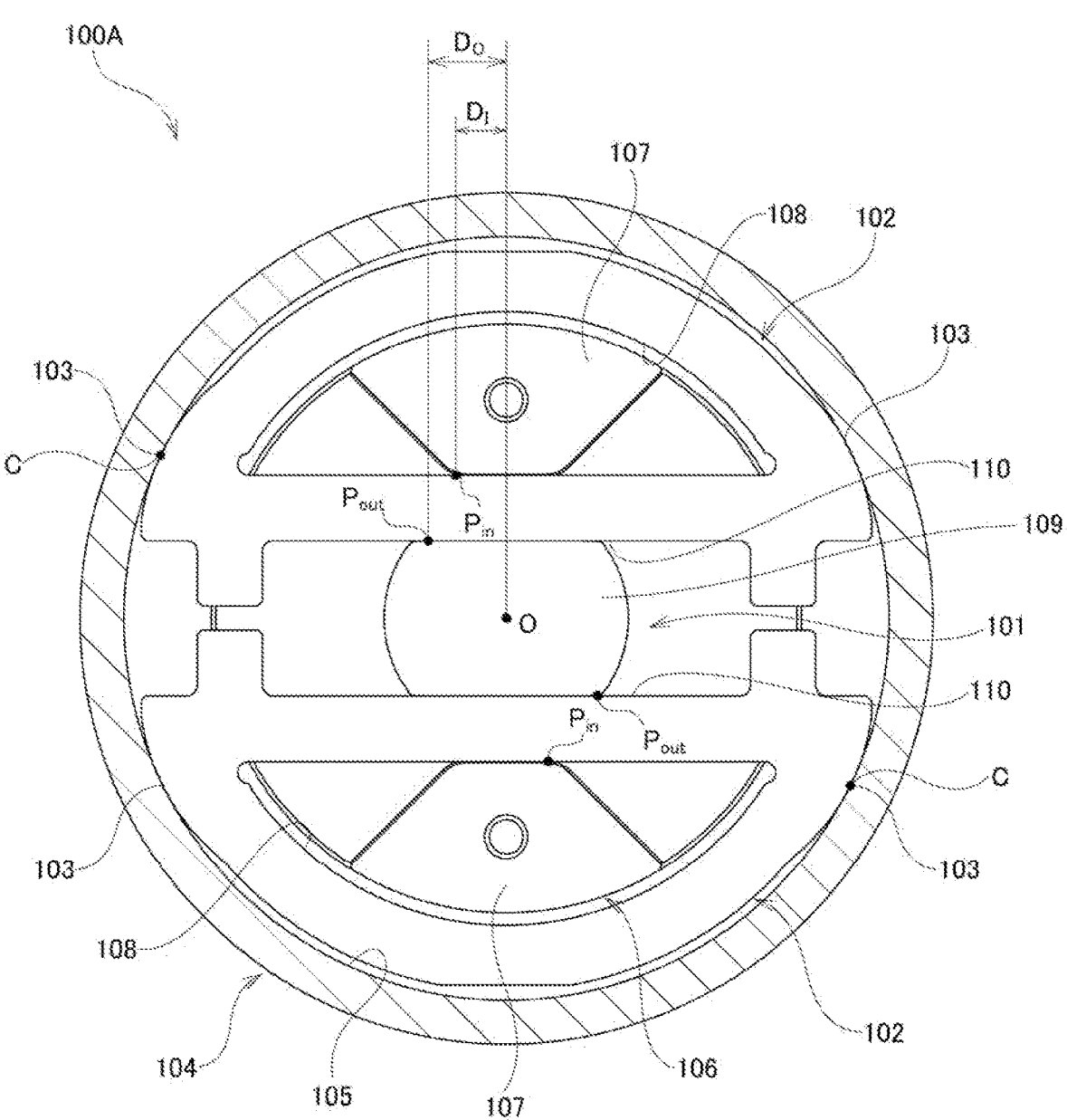
FIG. 11 is a cross-sectional view illustrating a reverse input cutoff clutch according to a first comparative example.
Figure 12:
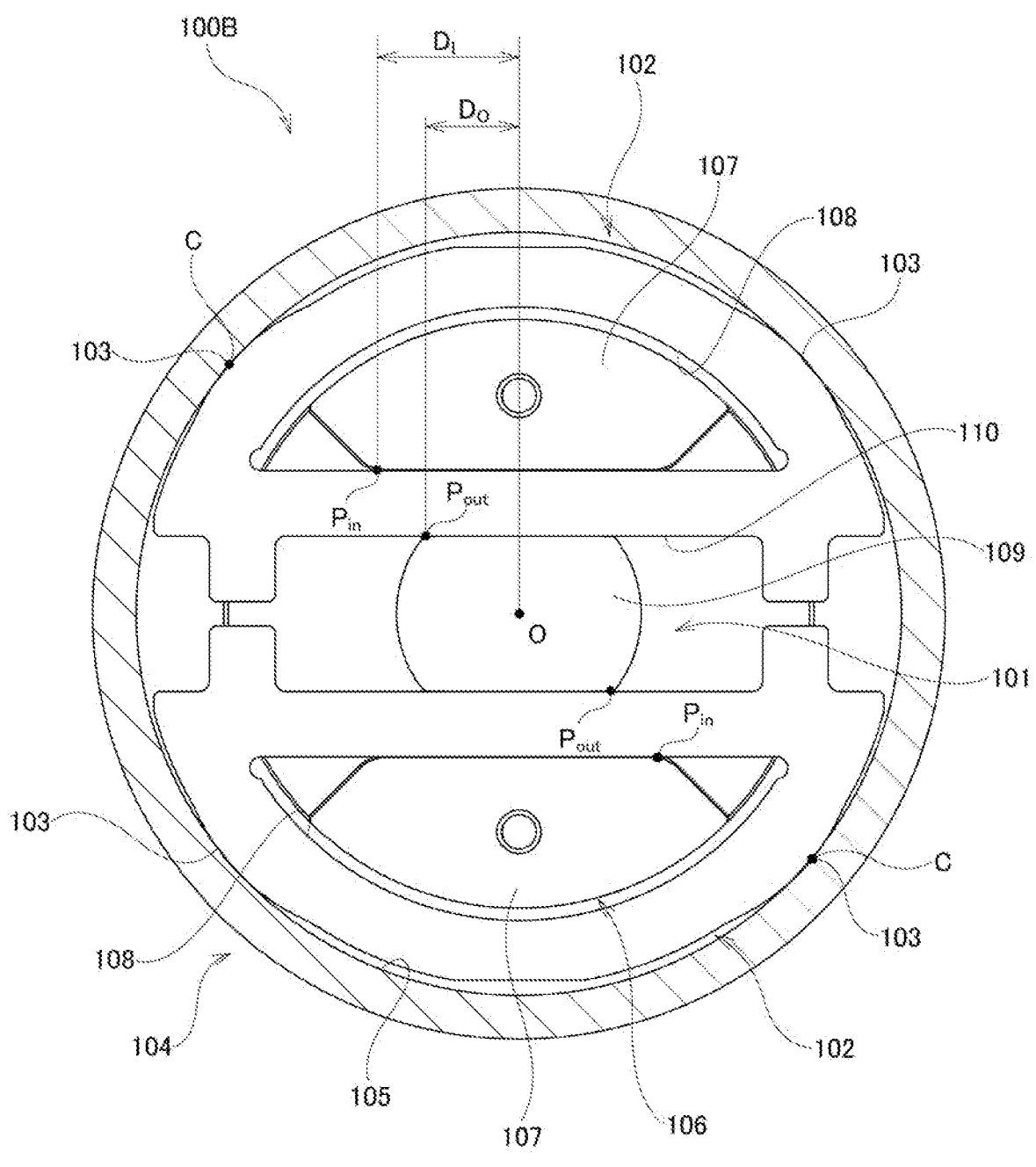
FIG. 12 is a cross-sectional view illustrating a reverse input cutoff clutch according to a second comparative example.
Figure 13:
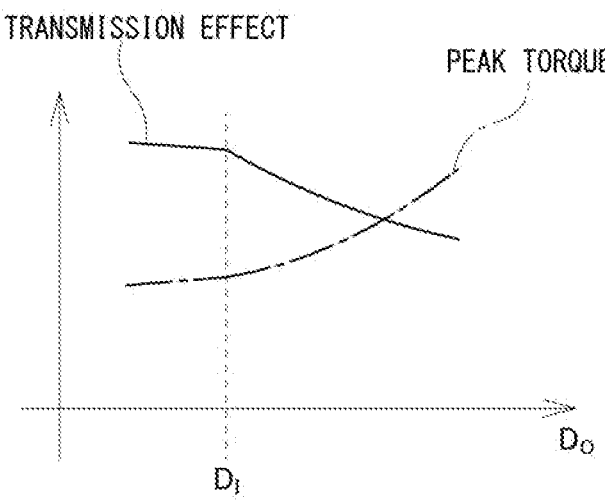
FIG. 13 is a diagram schematically showing a relationship between a second distance $D_O$, a peak torque during an unlocked or half-unlocked state, and an amount of return of the output member during a locked or half-locked state.

Comparative examples are illustrated in FIGS. 11 to 13. In the comparative examples, there is room for improvement in terms of achieving both unlocking performance and locking performance. The reason for this will be described with reference to FIGS. 11 to 13. Further, the unlocking performance relates to switching from a locked state or half-locked state in which the pair of pressing surfaces are pressed against the pressed surface to an unlocked state in which the pair of pressing surfaces are separated from the pressed surface. The locking performance relates to switching from the unlocked state to the locked or half-locked state. In the following description, basically, the term "locked state" is used including a half-locked state, and the term "unlocked state" is used including a half-unlocked state.

In the comparative example (reverse input cutoff clutch 100A) illustrated in FIG. 11, as an output member 101 rotates, a pair of pressing surfaces 103 of an engagement element 102 are pressed against a pressed surface 105 of a pressed member 104. Also, as an input member 106 rotates, an input side engaging part 107 comes into contact with an input side engaged part 108. A distance $D_I$ in a width direction (the left-right direction in FIG. 11) of the engagement element 102 between an input side contact part $P_{in}$, which is a contact part of the input side engaging part 107 and the input side engaged part 108, and the rotation center O of the input member 106 is smaller than a distance $D_O$ in the width direction of the engagement element 102 between an output side contact part $P_{out}$, which is a contact part of an output side engaging part 109 and an output side engaged part 110, and the rotation center O of the output member 4 ($D_I < D_O$).

In the comparative example of FIG. 11, when a rotational torque is input to the input member 106 in a locked state, the engagement element 102 tends to rotate in a direction opposite to a rotation direction of the input member 106 with the output side contact part Pw as a center. Therefore, neither of the pair of pressing surfaces 103 is substantially pressed against the pressed surface 105, or the pressing surface 103 (the pressing surface 103 on a side closer to the input side contact part $P_{in}$ than the rotation center O of the input member 106 in the width direction of the engagement element 102) is pressed against the pressed surface 105 with a relatively small pressing force. In this case, the pressing surface 103 is prevented from strongly biting into the pressed surface 105, and the rotational torque of the input member 106 is prevented from increasing instantaneously when the locked state is switched to an unlocked state. In other words, a peak torque at the time of unlocking can be reduced to be small. That is, the reverse input cutoff clutch 100A of FIG. 11 has relatively satisfactory unlocking performance.

On the other hand, the comparative example (reverse input cutoff clutch 100B) in FIG. 12 has relatively satisfactory locking performance. In a reverse input cutoff clutch 100B illustrated in FIG. 12, a first distance $D_I$ which is a distance between the input side contact part $P_{in}$ and the rotation center O of the input member 106 in the width direction of the engagement element 102 is larger than a second distance $D_O$ between the output side contact part $P_{out}$ and the rotation center O of the output member 4 in the width direction of the engagement element 102 ($D_I > D_O$).

In the comparative example of FIG. 12, when a rotational torque in a predetermined direction (for example, the counterclockwise direction in FIG. 12) is input to the input member 106, the engagement element 102 tends to rotate in the predetermined direction with the input side contact part $P_{out}$ as a center. For example, the pressing surface 103 of the engagement element 102 (the pressing surface 103 on a right side of the engagement element 102 on an upper side in FIG. 12, and the pressing surface 103 on a left side of the engagement element 102 on a lower side in FIG. 12) tends to come closer to (approach) the pressed surface 105.

Therefore, in the comparative example of FIG. 12, in an unlocked state (a rotational torque input to the input member 106 is transmitted to the output member 101), the pressing surface 103 of each engagement element 102 tends to approach the pressed surface 105. In this case, when a rotational torque is reversely input to the output member 101, the pressing surface 103 is immediately pressed against the pressed surface 105. That is, in the comparative example of FIG. 12, switching from the unlocked state to the locked state can be made quickly.

However, in the comparative example of FIG. 12, when the rotational torque input to the input member 106 is transmitted to the output member 101 via the pair of engagement elements 102, there is a likelihood that dragging will occur between one pressing surface 103 of each of the engagement elements 102 and the pressed surface 105. This is disadvantageous in securing transmission efficiency of the torque.

In these comparative examples (reverse input cutoff clutch 100A, 100B), for the purpose of achieving both locking performance and the unlocking performance, it is conceivable that the distance $D_I$ between the input side contact part $P_{in}$ and the rotation center O of the input member 106 is made to coincide with the distance $D_O$ between the output side contact part $P_{out}$ and the rotation center O of the output member 101.

However, as shown in FIG. 13, a magnitude of a peak torque when the locked state is switched to the unlocked state, and transmission efficiency between the input member 106 and the output member 101 show an inflection point when the distance $D_O$ is equal to the distance $D_I$. That is, the magnitude of the peak torque and the transmission efficiency significantly change in tendency on both sides of a point at which the distance $D_O$ and the distance $D_I$ are equal. Therefore, in order to achieve both the locking performance and the unlocking performance, the output member 101, the engagement element 102, and the input member 106 need to have a sufficiently high shape accuracy and assembly accuracy. This is disadvantageous in terms of manufacturing costs of the reverse input cutoff clutches 100A and 100B.

In the present embodiment illustrated in FIGS. 5 to 7, since positions of the constituent elements, relative positional relationships between the constituent elements, relative relationships regarding distances between the constituent elements, and the like are set as described above, it is advantageous in achieving both the unlocking performance and the locking performance.

First, in switching from the locked state to the unlocked state, excellent unlocking performance is realized via the first engagement element 5a. For example, as illustrated in FIG. 6, in the locked state, if a rotational torque in a predetermined direction (the counterclockwise direction in FIG. 6) is input to the input member 3, the first engagement element 5a tends to rotate in a direction opposite to the rotation direction of the input member 3 with respect to the output side contact part (the fifth contact part $P_{O1}$) which is a contact part between the output side engaged part 35 of the first engagement element 5a and the output side engaging part 31. Therefore, neither of the pair of pressing surfaces 33 is substantially pressed against the pressed surface 7 as illustrated in FIG. 8(A) to be described later, or the pressing surface 33 (the pressing surface 33 on a side closer to the input side contact part $P_{I1}$ between the first input side engaging part 27a and the input side engaged part 34 of the first engagement element 5a than the rotation center O of the input member 3 in the second direction) is pressed against the pressed surface 7 with a relatively small pressing force as illustrated in FIG. 8(C). In this case, for the first engagement element 5a, the pressing surface 33 is prevented from strongly biting into the pressed surface 7. Therefore, when the locked state is switched to the unlocked state, the pressing surface 33 of the first engagement element 5a smoothly moves in a direction away from the pressed surface 7 in the first direction. Therefore, in the reverse input cutoff clutch 1, switching from the locked state to the unlocked state is smoothly performed, and satisfactory unlocking performance is secured.

Next, in switching from the unlocked state to the locked state, excellent locking performance is realized via the second engagement element 5b. As illustrated in FIG. 5, in the second engagement element 5b, the third distance $D_{I3}$ and the fourth distance $D_{I4}$ are respectively larger than the seventh distance $D_{O1}$ and the eighth distance $D_{O4}$, and one of the pressing surfaces 33 of the second engagement element 5b tends to come close to the pressed surface 7 in the unlocked state. In this case, if the rotational torque is reversely input to the output member 4, the pressing surface 33 is immediately pressed against the pressed surface 7. Therefore, in the reverse input cutoff clutch 1, the unlocked state is quickly switched to the locked state, and satisfactory locking performance is secured.

In the reverse input cutoff clutch 1 of the present example, as described above, the first engagement element 5a mainly relates to the satisfactory unlocking performance, and the second engagement element 5b mainly relates to the satisfactory locking performance. Therefore, set values of the elements related to each function can be adjusted independently. That is, a structure in which both the locking performance and the unlocking performance are achieved is realized without excessively increasing accuracies of various types (for example, shape accuracies, assembly accuracies, and the like of the input member 3, the output member 4, and the pair of engagement elements 5a and 5b). Therefore, the reverse input cutoff clutch 1 has stable performance such as achieving both the locking performance and the unlocking performance, and is advantageous in reducing manufacturing costs.

In the reverse input cutoff clutch 1 of the present example, in a plan view perpendicular to the central axis O, with the first reference line RL1 as a boundary, the first contact part $P_{I1}$, the third contact part $P_{I3}$, the fifth contact part $P_{O1}$, the seventh contact part $P_{O3}$, the ninth contact part C1, and the eleventh contact part C3 belong to an X1 group (the left group in FIGS. 5 and 7), and the second contact part $P_{I2}$, the fourth contact part $P_{I4}$, the sixth contact part $P_{O2}$, the eighth contact part $P_{O4}$, the tenth contact part C2, and the twelfth contact part C4 belong to an X2 group (the right group in FIGS. 5 and 7). The contact parts $P_{I1}$, $P_{I3}$, $P_{O1}$, $P_{O3}$, C1, and C3 of the X1 group, and the contact parts $P_{I2}$, $P_{I4}$, $P_{O2}$, $P_{O4}$, C2, and C4 of the X2 group have substantially symmetrical positional relationships with respect to the first reference line RL1, respectively. The contact parts associated with each operation are symmetrically disposed with respect to the first reference line RL1. According to the reverse input cutoff clutch 1 of the present example, substantially the same performance is exhibited when the input member 3/the output member 4 move in a first rotation direction and when they move in a second rotation direction opposite to the first rotation direction.

Further, in the reverse input cutoff clutch 1 of the present example, as illustrated in FIG. 7, when the rotational torque is input to the output member 4 in at least one of the four quadrants (the first quadrant QR1, the second quadrant QR2, the third quadrant QR3, and fourth quadrant QR4), one of the fifth contact part $P_{O1}$, the sixth contact part $P_{O2}$, the seventh contact part $P_{O3}$, and the eighth contact part $P_{O4}$ is disposed in a region between the second reference line RL2 and the virtual straight line PL. In the present example, when the rotational torque is input to the output member 4, the fifth contact part $P_{O1}$ and the eighth contact part $P_{O4}$ are respectively disposed in the regions between the second reference line RL2 and the virtual straight line PL in the two quadrants QR2 and QR4 that are in a positional relationship diagonally opposite to each other. Alternatively, when the reverse rotational torque is input to the output member 4, the sixth contact part $P_{O2}$ and the seventh contact part $P_{O3}$ are respectively disposed in the regions between the second reference line RL2 and the virtual straight line PL in the two quadrants QR1 and QR3 that are in a positional relationship diagonally opposite to each other. This configuration is advantageous in smooth switching from the locked state to the unlocked state. The reason for this will be described with reference to FIGS. 8(A) to 8(C). Further, reference signs denoted in FIGS. 5 to 7 are appropriately used in the following description.

In the locked state of the reverse input cutoff clutch 1, if the rotational torque is input to the input member 3, the first engagement element 5a tends to rotate with respect to the output side contact part (for example, the contact part $P_{O1}$ in FIG. 8(a)) which is a contact part between the output side engaged part 35 of the first engagement element 5a and the output side engaging part 31.

In the example of FIG. 8(B), a distance ($D_{I1}$) in the second direction between the input side contact part ($P_{I1}$) of the first input side engaging part 27a and the input side engaged part 34 of the first engagement element 5a, and the rotation center O of the input member 3 is larger than a distance ($D_{O1}$) in the second direction between the output side contact part ($P_{O1}$) of the output side engaged part 35 of the first engagement element 5a and the output side engaging part 31, and the rotation center O of the output member 4 ($D_{I1} > D_{O1}$). In this case, as illustrated in FIG. 8(B), if a rotational torque in a counterclockwise direction is input to the input member 3, the first engagement element 5a tends to rotate in a counterclockwise direction with the output side contact part ($P_{O1}$) as a center. Then, as indicated by a locus r in FIG. 8(B) with a dashed-dotted line, of the two pressing surfaces 33, the pressing surface 33 positioned on a side (right side in FIG. 8(B)) opposite to the output side contact part ($P_{O1}$) with the rotation center O of the output member 4 interposed therebetween in the second direction tends to be strongly pressed against and bite into the pressed surface 7. If release of biting is accompanied when the locked state is switched to the unlocked state, the rotational torque of the input member 3 tends to increase instantaneously (a peak torque is generated).

In the example of FIG. 8(C), the output side contact part ($P_{O1}$) is positioned on a side farther from the rotation center O of the output member 4 in the first direction than the virtual straight line PL. In this case, as illustrated in FIG. 8(C), if a rotational torque in a counterclockwise direction is input to the input member 3, the first engagement element 5a tends to rotate in a clockwise direction with the output side contact part ($P_{O1}$) as a center. Then, as indicated by a locus r in FIG. 8(C) with a dashed-dotted line, of the two pressing surfaces 33, the pressing surface 33 positioned on a side (left side in FIG. 8(C)) closer to the output side contact part ($P_{O1}$) than the rotation center O of the output member 4 in the second direction tends to be pressed against and bite into the pressed surface 7. In the example of FIG. 8(C), if release of the biting is accompanied when the locked state is switched to the unlocked state, the rotational torque of the input member 3 is smaller than that in the example of FIG. 8(B), but it increases instantaneously.

In contrast, in the example of FIG. 8(A), the distance ($D_{I1}$) in the second direction between the input side contact part ($P_{I1}$) of the first input side engaging part 27a and the input side engaged part 34 of the first engagement element 5a, and the rotation center O of the input member 3 is smaller than the distance $D_{O1}$ in the second direction between the output side contact part ($P_{O1}$) of the output side engaged part 35 of the first engagement element 5a and the output side engaging part 31, and the rotation center O of the output member 4 ($D_{I4} < D_{O1}$) (see FIG. 5). Also, the fifth contact part ($P_{O1}$) is disposed in the region between the second reference line RL2 and the virtual straight line PL in the second quadrant QR2, and the eighth contact part ($P_{O4}$) is disposed in the region between the second reference line RL2 and the virtual straight line PL in the fourth quadrant QR4 (see FIG. 7). As illustrated in FIG. 8(A), when the output side contact part ($P_{O1}$) is positioned on a side closer to the rotation center O of the output member 4 in the first direction than the virtual straight line PL, if a rotational torque in a counterclockwise direction is input to the input member 3, the first engagement element 5a tends to rotate in a clockwise direction with the output side contact part ($P_{O1}$) as a center.

Here, in the example of FIG. 8(A), as indicated by loci $r_1$ and $r_2$ with dashed-dotted lines, both of the pair of pressing surfaces 33 being substantially pressed against the pressed surface 7 are avoided. Therefore, when the locked state is switched to the unlocked state, an instantaneous increase in the rotational torque of the input member 3 is suppressed, and a mode transitions smoothly from the locked state to the unlocked state. Also, since a peak torque is suppressed, a maximum output torque of the input side mechanism can be set to be relatively low. This is advantageous in avoiding unnecessary increase in size of the input side mechanism.

In one example of the reverse input cutoff clutch 1, the engagement elements 5a and 5b are elastically biased outward in the radial direction by the biasing member 6, and in a neutral state, the pressing surfaces 33 of each of the engagement elements 5a and 5b are disposed in contact with the pressed surface 7. Therefore, when the rotational torque is reversely input to the output member 4, rotation of the output member 4 can be immediately locked or half-locked.

In one example of the reverse input cutoff clutch 1, the support member 45 is provided to bridge between the distal end portions of the two input side engaging parts 27 provided in the input member 3. In this case, when the reverse input cutoff clutch 1 is switched from the locked state to the unlocked state or the like, even if the input side engaging part 27 receives a force directed outward in the radial direction from the engagement element 5, deformation of the input side engaging part 27 (for example, deformation such that the two input side engaging parts 27 are separated from each other) is prevented.

In one example of the reverse input cutoff clutch 1, the first element 8 having the pressed surface 7 and the second element 9 having the attachment parts 20 supported by and fixed to the fixed portion are formed separately. That is, the first element 8 having the pressed surface 7 is indirectly fixed to the fixed portion and thus is prevented from being fixed by direct bolting. The support bolts inserted through the attachment holes 24 of the second element 9 are screwed into the screw holes of the fixed portion and then further fastened, and thereby the pressed member 2 is supported by and fixed to the fixed portion to prevent deformation of the first element 8 from occurring. Also, deterioration in roundness of the pressed surface 7 provided on an inner circumferential surface of the first large-diameter cylindrical part 11 of the first element 8 is prevented. As a result, the locking performance of switching the reverse input cutoff clutch 1 from the unlocked state to the locked state is satisfactorily secured, and/or controllability of machine equipment incorporating the reverse input cutoff clutch 1 is satisfactorily secured.

In one example of the reverse input cutoff clutch 1, the inner diameter side fitting surface 15 provided on an outer circumferential surface of the first large-diameter cylindrical part 11 of the first element 8 and the outer diameter side fitting surface 21 provided on an inner circumferential surface of the second large-diameter cylindrical part 17 of the second element 9 are fitted without rattling. In this case, even if the pressed surface 7 is pressed outward in the radial direction by the pressing surfaces 33 of each of the engagement elements 5a and 5b due to the reverse input of the rotational torque to the output member 4, the pressed surface 7 is prevented from deforming outward in the radial direction.

Figure 2:
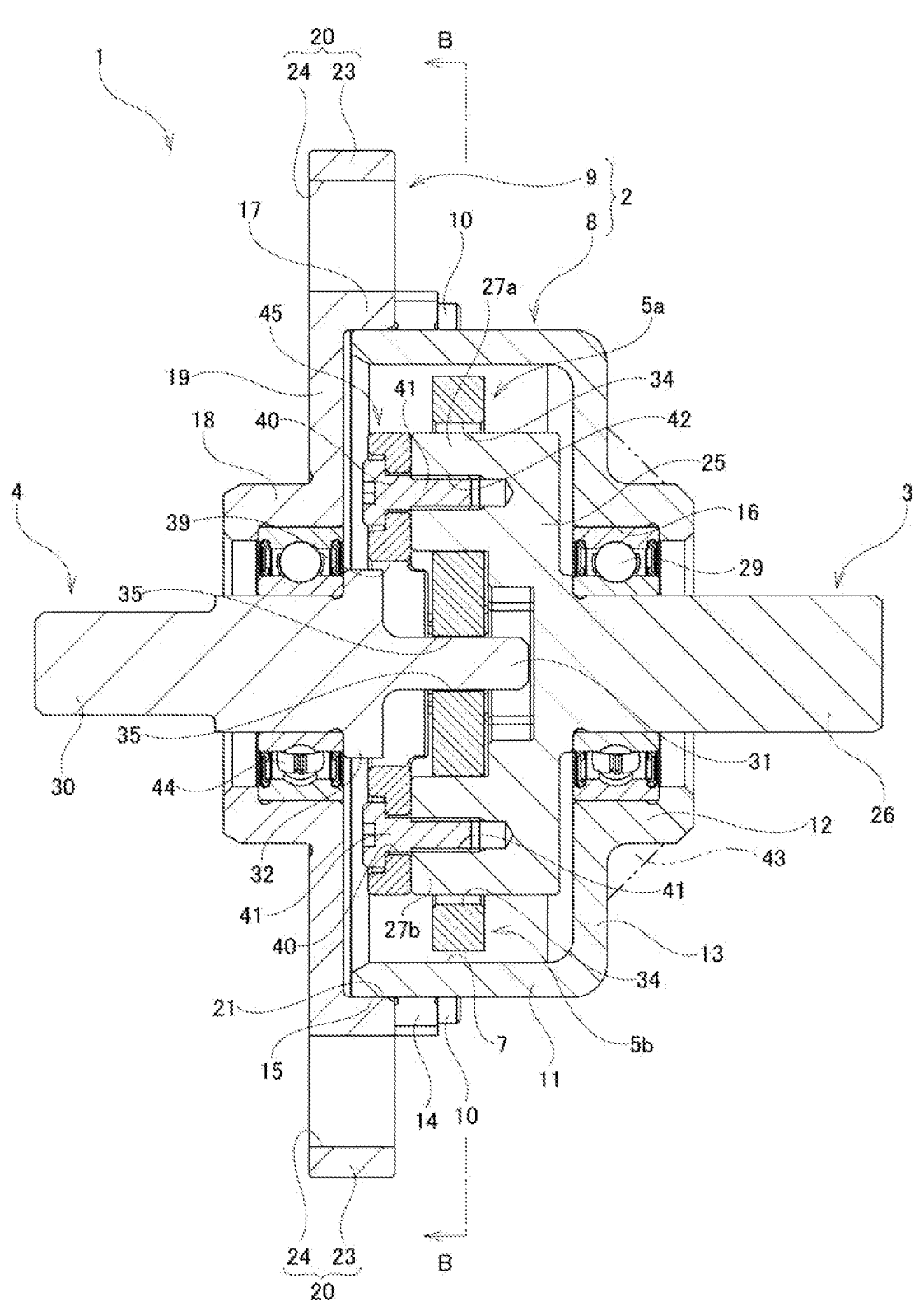
FIG. 2 is a cross-sectional view along line A-A of FIG. 1.
Figure 3:
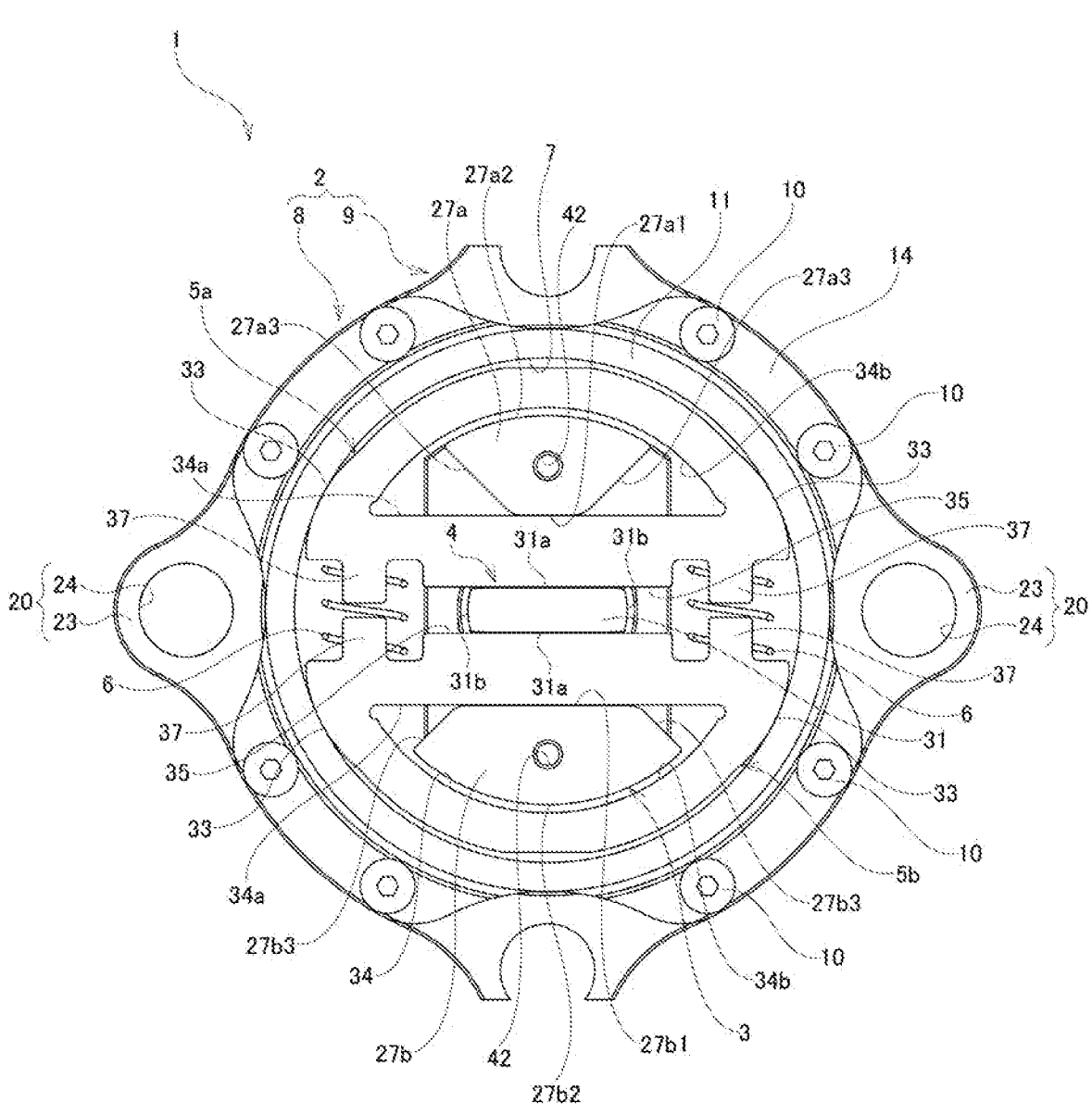
FIG. 3 is a cross-sectional view along line B-B of FIG. 2.

In another example of the reverse input cutoff clutch 1, as indicated by the two-dot chain line in FIG. 2, a reinforcing rib 43 bridging an outer circumferential surface of the first small-diameter cylindrical part 12 of the first element 8 and a side surface of the first side plate part 13 on one side in the axial direction can be provided. The reinforcing rib 43 is advantageous in more effectively preventing deformation of the pressed surface 7.

In one example of the reverse input cutoff clutch 1, of the inner circumferential surface of the first large-diameter cylindrical part 11, a hardened layer is formed only on the pressed surface 7 and a portion in the vicinity thereof by high-frequency hardening, and then is subjected to polishing processing. Thereby, a dimensional accuracy and a roundness of the pressed surface 7 are secured while securing hardness of the pressed surface 7. Further, in the reverse input cutoff clutch 1, the mode is smoothly switched from the unlocked state to the locked state.

In one example of the reverse input cutoff clutch 1, the input member 3 is rotatably supported by the first element 8 having the pressed surface 7, and the output member 4 is rotatably supported by the second element 9 having the attachment parts 20. In another example, the input member can be rotatably supported by the second element having the attachment parts supported by and fixed to a fixed portion, and the output member can be rotatably supported by the first element having the pressed surface. In still another example, a configuration in which the pressed surface and the attachment parts are provided on the same element can be applied.

Further, materials of the input member, the output member, the pressed member, and the engagement element are not particularly limited. For example, materials for these may be a metal such as an iron alloy, a copper alloy, and an aluminum alloy, and may also be a synthetic resin in which reinforcing fibers are mixed as need, or the like. Also, the input member, the output member, the pressed member, and the engagement element may be made of the same material or different materials.

Additionally and/or alternatively, if a condition that the output member is locked or semi-locked when the rotational torque is reversely input to the output member is satisfied, a lubricant can be interposed in a portion in which the input member, the output member, the pressed member, and the engagement element come into contact with each other. For example, at least one of the input member, the output member, the pressed member, and the engagement element may be made of oil-impregnated metal.

Second Embodiment

A second embodiment will be described with reference to FIG. 9. In one example of a reverse input cutoff clutch 1a, a pair of input side engaging parts 27c and 27d provided in an input member 3a are asymmetrical in a circumferential direction when viewed from an axial direction, and have a substantially fan-shaped or substantially trapezoidal end surface shape in which a circumferential width increases toward an outer side in the radial direction. In the following description, constituent portions the same as or equivalent to those of the above-described embodiment will be denoted by the same reference signs, and description thereof will be simplified or omitted.

In the reverse input cutoff clutch 1a of the present example, a first group including a first contact part $P_{I1}$ and a third contact part $P_{I3}$ and a second group including a second contact part $P_{I2}$ and a fourth contact part $P_{I4}$ are disposed apart from each other with a first reference line RL1 interposed therebetween. The two contact parts $P_{I1}$ and $P_{I3}$ of the first group are respectively disposed closer to the first reference line RL1 than a fifth contact part $P_{O1}$ and a seventh contact part $P_{O3}$ are. The two contact parts $P_{I2}$ and $P_{I4}$ of the second group are respectively disposed farther from the first reference line RL1 than a sixth contact part $P_{O2}$ and an eighth contact part $P_{O4}$ are.

In the present example, as the input member 3a rotates in a predetermined direction (counterclockwise direction indicated by an arrow F in FIG. 9), the pair of input side engaging parts 27c and 27d come into contact with input side engaged parts 34 of a pair of engagement elements 5a and 5b at the first contact part $P_{I1}$ dand the fourth contact part $P_{I4}$. Also, as the input member 3a rotates in a direction opposite to the predetermined direction (clockwise direction indicated by an arrow R in FIG. 9), the pair of input side engaging parts 27c and 27d come into contact with the input side engaged parts 34 of the pair of engagement elements 5a and 5b at the second contact part Pu and the third contact part $P_{I3}$. On the other hand, in rotation of an output member 4 in one direction, an output side engaging part 31 of the output member 4 comes into contact with the engagement elements 5a and 5b at the fifth contact part $P_{O1}$ and the eighth contact part $P_{O4}$. In rotation of the output member 4 in an opposite direction, the output side engaging part 31 comes into contact with the engagement elements 5a and 5b at the sixth contact part $P_{O2}$ and the seventh contact part $P_{O3}$.

In the present example, a first distance $D_{I1}$ and a third distance $D_{I3}$ are respectively smaller than a fifth distance $D_{O1}$ and a seventh distance $D_{O3}$, and a second distance $D_{I2}$ and a fourth distance $D_{I4}$ are respectively larger than a sixth distance $D_{O2}$ and an eighth distance $D_{O4}$.

In the present example, the first contact part $P_{I1}$ and the third contact part $P_{I3}$, and the second contact part $P_{I2}$ and the fourth contact part $P_{I4}$ are positioned substantially asymmetrically with respect to the first reference line RL1, respectively. The first contact part $P_{I1}$ and the second contact part $P_{I2}$, and the third contact part $P_{I3}$ and the fourth contact part $P_{I4}$ are positioned substantially symmetrically with respect to the second reference line RL2, respectively. Also, in a plan view perpendicular to a central axis O, the fifth contact part Pot and the seventh contact part $P_{O3}$, and the sixth contact part $P_{O2}$ and the eighth contact part $P_{O4}$ are positioned substantially symmetrically with respect to the first reference line RL1, respectively. Also, the fifth contact part $P_{O1}$ and the sixth contact part $P_{O2}$, and the seventh contact part $P_{O3}$ and the eighth contact part $P_{O4}$ are positioned substantially symmetrically with respect to the second reference line RL2, respectively.

In the present example, the first distance $D_{I1}$ and the third distance $D_{I3}$ are substantially the same, the second distance $D_{I2}$ and the fourth distance $D_{I4}$ are substantially the same, and the first distance $D_{I1}$ and the third distance $D_{I3}$ are different from the second distance $D_{I2}$ and the fourth distance $D_{I4}$, respectively. Also, the fifth distance $D_{O1}$ and the seventh distance $D_{O3}$ are substantially the same, and the sixth distance $D_{O2}$ and the eighth distance $D_{O4}$ are substantially the same. In the present example, $D_{I1}=D_{I3}<D_{I2}=D_{I4}$, and $D_{O1}=D_{O2}=D_{O3}=D_{O4}$. Also, $D_{I1}=D_{I3}<D_{O1}=D_{O3}$, and $D_{I2}=D_{I4}>D_{O2}=D_{O4}$.

Figure 9:
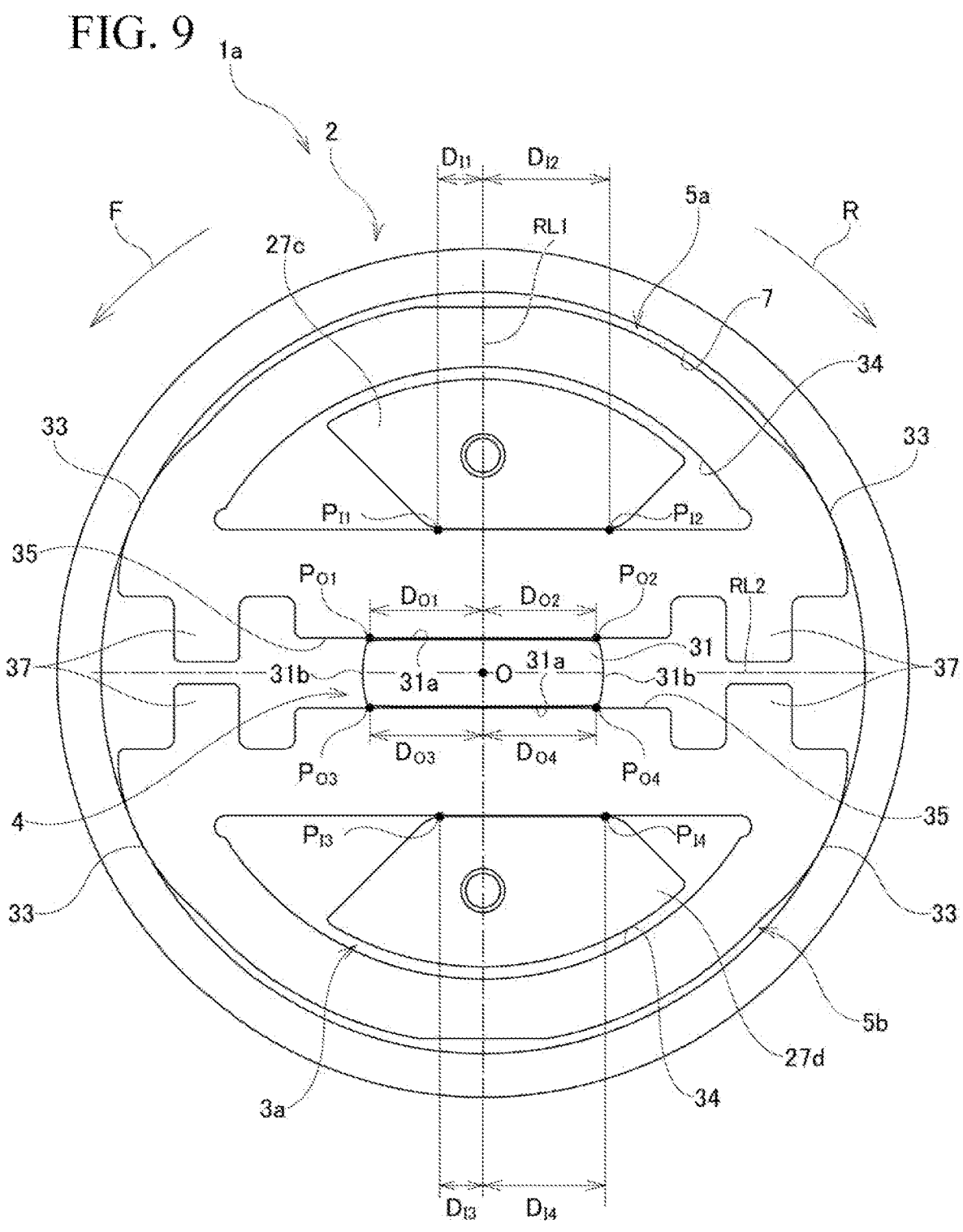
FIG. 9 is a view schematically illustrating a reverse input cutoff clutch according to a second embodiment.

In the reverse input cutoff clutch 1a of the present example, in a plan view perpendicular to the central axis O, with the second reference line RL2 as a boundary, the first contact part $P_{I1}$, the second contact part $P_{I2}$, the fifth contact part $P_{O1}$, the sixth contact part $P_{O2}$, a ninth contact part C1, and a tenth contact part C2 belong to a Y1 group (a group on an upper side in FIG. 9), and the third contact part $P_{I3}$, the fourth contact part $P_{I4}$, the seventh contact part $P_{O3}$, the eighth contact part $P_{O4}$, an eleventh contact part C3, and a twelfth contact part C4 belong to a Y2 group (a group on a lower side in FIG. 9). The contact parts $P_{I1}$, $P_{I2}$, $P_{O1}$, $P_{O2}$, C1, and C2 of the Y1 group, and the contact parts $P_{I3}$, $P_{I4}$, $P_{O3}$, $P_{O4}$, C3, and C4 of the Y2 group have substantially symmetrical positional relationships with respect to the second reference line RL2, respectively. The contact parts associated with each operation are symmetrically disposed with respect to the second reference line RL2. According to the reverse input cutoff clutch 1a of the present example, substantially the same performance is exhibited when the input member 3a/the output member 4 move in a first rotation direction and when they move in a second rotation direction opposite to the first rotation direction.

In the second embodiment illustrated in FIG. 9, since positions of the constituent elements, relative positional relationships between the constituent elements, relative relationships regarding distances between the constituent elements, and the like are set as described above, similarly to the above-described embodiment, it is advantageous in having stable performance such as achieving both the locking performance and the unlocking performance, and reducing manufacturing costs. Also, since a peak torque is suppressed, a maximum output torque of an input side mechanism can be set to be relatively low. This is advantageous in avoiding unnecessary increase in size of the input side mechanism. Configurations and effects of other portions are the same as those in the above-described embodiment.

Third Embodiment

A third embodiment will be described with reference to FIG. 10. In one example of a reverse input cutoff clutch 1b, a pair of input side engaging parts 27e and 27f provided in an input member 3b have substantially the same shape and size as each other. In the present example, the input side engaging parts 27e and 27f have shapes that are substantially symmetrical to each other with respect to a first reference line RL1. The output member 4b has an asymmetric shape with respect to the first reference line RL1. In the following description, constituent portions the same as or equivalent to those of the above-described embodiment will be denoted by the same reference signs, and description thereof will be simplified or omitted.

In the reverse input cutoff clutch 1b of the present example, a first group including a second contact part $P_{I2}$ and a fourth contact part $P_{I4}$ and a second group including a first contact part $P_{I1}$ and a third contact part $P_{I3}$ are disposed apart from each other with the first reference line RL1 interposed therebetween. The two contact parts $P_{I2}$ and $P_{I4}$ of the first group are respectively disposed closer to the first reference line RL1 than a sixth contact part $P_{O2}$ and an eighth contact part $P_{O4}$ are. The two contact parts $P_{I1}$ and $P_{I3}$ of the second group are respectively disposed farther from the first reference line RL1 than the fifth contact part $P_{O1}$ and the seventh contact part $P_{O3}$ are.

In the present example, as the input member 3b rotates in a predetermined direction, the pair of input side engaging parts 27e and 27f come into contact with input side engaged parts 34 of a pair of engagement elements 5a and 5b at the first contact part $P_{I1}$ and the fourth contact part $P_{I4}$. Also, as the input member 3a rotates in a direction opposite to the predetermined direction described above, the pair of input side engaging parts 27e and 27f come into contact with the input side engaged parts 34 of the pair of engagement elements 5a and 5b at the second contact part Pu and the third contact part $P_{I3}$. On the other hand, in rotation of an output member 4b in one direction, an output side engaging part 31 of an output member 4b comes into contact with the engagement elements 5a and 5b at the fifth contact part $P_{O1}$ and the eighth contact part $P_{O4}$. In rotation of the output member 4b in an opposite direction, the output side engaging part 31 comes into contact with the engagement elements 5a and 5b at the sixth contact part $P_{O2}$ and the seventh contact part $P_{O3}$.

In the present example, a second distance $D_{I2}$ and a fourth distance $D_{I4}$ are respectively smaller than a sixth distance $D_{O2}$ and an eighth distance $D_{O4}$, and a first distance $D_{I1}$ and a third distance $D_{I3}$ are respectively larger than a fifth distance $D_{O1}$ and a seventh distance $D_{O3}$.

In the present example, the first contact part $P_{I1}$ and the third contact part $P_{I3}$, and the second contact part $P_{I2}$ and the fourth contact part $P_{I4}$ are positioned substantially symmetrically with respect to the first reference line RL1, respectively. Also, the first contact part $P_{I1}$ and the second contact part $P_{I2}$, and the third contact part $P_{I3}$ and the fourth contact part $P_{I4}$ are positioned substantially symmetrically with respect to the second reference line RL2, respectively. Also, in a plan view perpendicular to a central axis O, the fifth contact part $P_{O1}$ and the seventh contact part $P_{O3}$, and the sixth contact part $P_{O2}$ and the eighth contact part $P_{O4}$ are positioned substantially asymmetrically with respect to the first reference line RL1, respectively. Also, the fifth contact part $P_{O1}$ and the sixth contact part $P_{O2}$, and the seventh contact part $P_{O3}$ and the eighth contact part $P_{O4}$ are positioned substantially symmetrically with respect to the second reference line RL2, respectively.

In the present example, the first distance $D_{I1}$ and the third distance $D_{I3}$ are substantially the same, and the second distance $D_{I2}$ and the fourth distance $D_{I4}$ are substantially the same. Also, the fifth distance $D_{O1}$ and the seventh distance $D_{O3}$ are substantially the same, and the sixth distance $D_{O2}$ and the eighth distance $D_{O4}$ are substantially the same. In the present example, $D_{I1}=D_{I2}=D_{I3}=D_{I4}$, and $D_{O1}=D_{O3}<D_{O2}=D_{O4}$. Also, $D_{I1}=D_{I3}>D_{O1}=D_{O3}$, and $D_{I2}=D_{I4}<D_{O2}=D_{O4}$.

Figure 10:
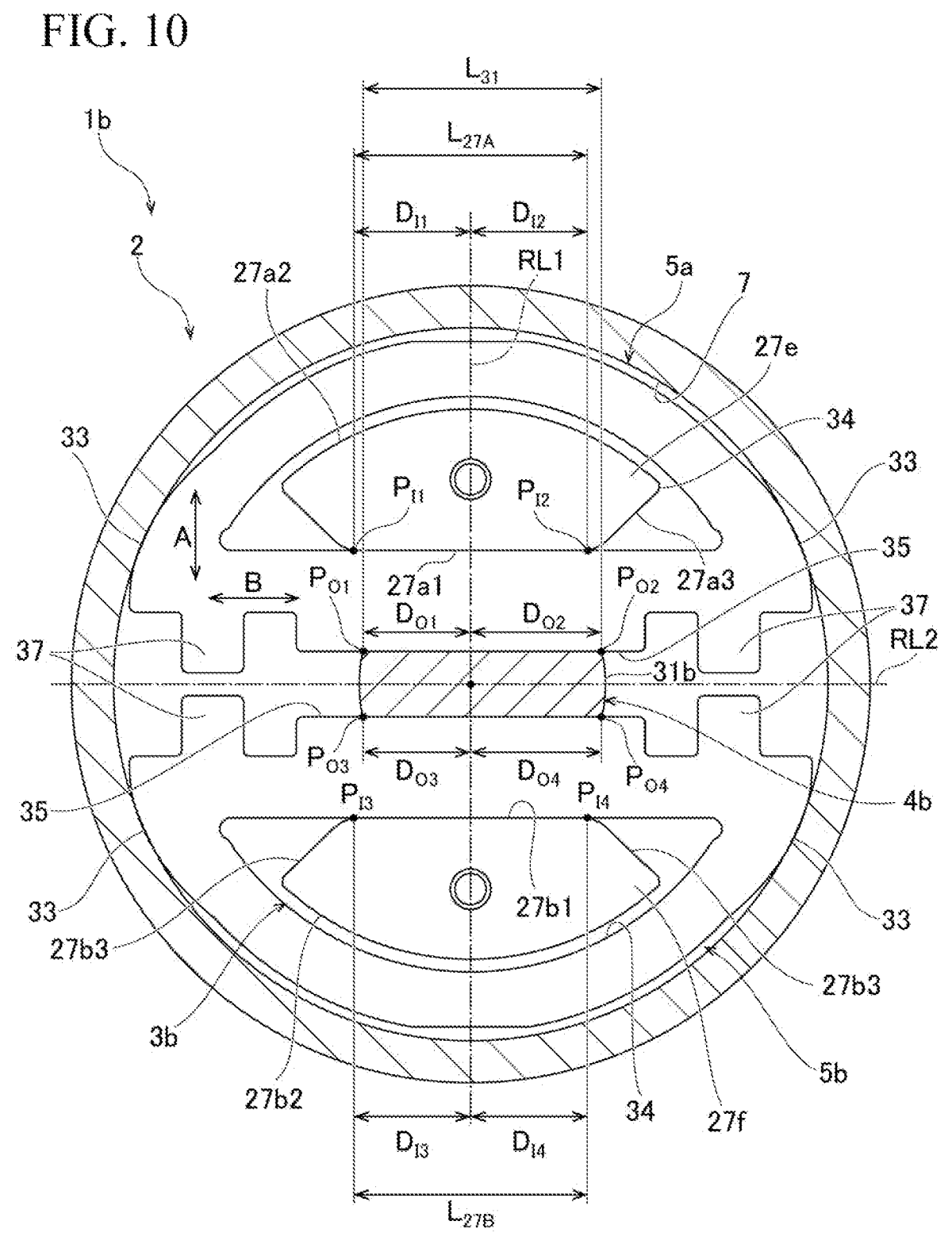

In the reverse input cutoff clutch 1b of the present example, in a plan view perpendicular to the central axis O, with the second reference line RL2 as a boundary, the first contact part $P_{I1}$, the second contact part $P_{I2}$, the fifth contact part $P_{O1}$, the sixth contact part $P_{O2}$, a ninth contact part C1, and a tenth contact part C2 belong to a Z1 group (a group on an upper side in FIG. 10), and the third contact part $P_{I3}$, the fourth contact part $P_{I4}$, the seventh contact part $P_{O3}$, the eighth contact part $P_{O4}$, an eleventh contact part C3, and a twelfth contact part C4 belong to a Z2 group (a group on a lower side in FIG. 10). The contact parts $P_{I1}$, $P_{I2}$, $P_{O1}$, $P_{O2}$, C1, and C2 of the Z1 group, and the contact parts $P_{I3}$, $P_{I4}$, $P_{O3}$, $P_{O4}$, C3, and C4 of the Z2 group have substantially symmetrical positional relationships with respect to the second reference line RL2, respectively. The contact parts associated with each operation are symmetrically disposed with respect to the second reference line RL2. According to the reverse input cutoff clutch 1b of the present example, substantially the same performance is exhibited when the input member 3b/the output member 4b move in a first rotation direction and when they move in a second rotation direction opposite to the first rotation direction.

In the third embodiment illustrated in FIG. 10, since positions of the constituent elements, relative positional relationships between the constituent elements, relative relationships regarding distances between the constituent elements, and the like are set as described above, similarly to the above-described embodiments, it is advantageous in having stable performance such as achieving both the locking performance and the unlocking performance, and reducing manufacturing costs. Also, since a peak torque is suppressed, a maximum output torque of an input side mechanism can be set to be relatively low. This is advantageous in avoiding unnecessary increase in size of the input side mechanism. Configurations and effects of other portions are the same as those in the above-described embodiments.

Although various embodiments and modified examples have been described above, the present invention is not limited to these contents. One embodiment and another embodiment described above can be combined. Other aspects conceivable within the scope of the technical idea of the present invention are also included within the scope of the present invention.

In a modified example (not illustrated) in which the embodiments are combined, the first distance $D_{I1}$ and the third distance $D_{I3}$ are substantially the same, and the second distance $D_{I2}$ and the fourth distance $D_{I4}$ are substantially the same. Also, the second distance $D_{I2}$ (the fourth distance $D_{I4}$) is smaller than the first distance $D_{I1}$ (the third distance $D_{I3}$). Also, the fifth distance $D_{O1}$ and the seventh distance $D_{O3}$ are substantially the same, and the sixth distance $D_{O2}$ and the eighth distance $D_{O4}$ are substantially the same. Also, the sixth distance $D_{O2}$ (the eighth distance $D_{O4}$) is smaller than the fifth distance $D_{O1}$ (the seventh distance $D_{O3}$). In the present example, $D_{I1}=D_{I3}>D_{I2}=D_{I4}$, and $D_{O1}=D_{O3}>D_{O2}=D_{O4}$. Also, $D_{I1}=D_{I3}>D_{O1}=D_{O3}$, and $D_{I2}=D_{I4}<D_{O2}=D_{O4}$.

REFERENCE SIGNS LIST 1, 1a, 1b Reverse input cutoff clutch
2 Pressed member
3, 3a, 3b Input member
4, 4b Output member
5a, 5b Engagement element
6 Biasing member
7 Pressed surface
8 First element
9 Second element
10 Connecting bolt
11 First large-diameter cylindrical part
12 First small-diameter cylindrical part
13 First side plate part
14 Flange part
15 Inner diameter side fitting surface
16 First bearing fitting surface
17 Second large-diameter cylindrical part
18 Second small-diameter cylindrical part
19 Second side plate part
20 Attachment part
21 Outer diameter side fitting surface
22 Second bearing fitting surface
23 Protruding part
24 Attachment hole
25 Base plate part
26 Input shaft part
27a, 27b, 27c, 27d, 27e. 27f Input side engaging part
27a1, 27b1 Radial inner surface
27a2, 27b2 Radial outer surface
27a3, 27b3 Circumferential side surface
28a, 28b Shank part
29 First bearing
30 Output shaft part 31 Output side engaging part
31a Flat surface
31b Convex curved surface
32 Flange part
33 Pressing surface
34 Input side engaged part
34a Flat surface
34b Concave curved surface
35 Output side engaged part
37 Protruding part
38 Support member
39 Large-diameter through hole
40 Small-diameter through hole
41 Support bolt
42 Screw hole
43 Reinforcing rib
44 Second bearing
45 Support member
100A, 100B Reverse input cutoff clutch
101 Output member
102 Engagement element
103 Pressing surface
104 Pressed member
105 Pressed surface
106 Input member
107 Input side engaging part
108 Input side engaged part
109 Output side engaging part
110 Output side engaged part

The invention claimed is:

1. A reverse input cutoff clutch comprising:
a fixed part having an inner wall surface;
an input member including an input shaft, and first and second input side engaging parts disposed apart from each other in a first radial direction with a central axis of the input shaft interposed therebetween;
an output member including an output shaft disposed coaxially with the input shaft, and an output side engaging part disposed between the first input side engaging part and the second input side engaging part in the first radial direction; and
first and second engagement elements disposed to be able to change a position and/or a posture thereof, and configured such that if a rotational torque is input to the input member, the rotational torque is transmitted to the output member via at least one of the first and second engagement elements, and if a rotational torque is input to the output member, at least a part of the rotational torque is transmitted to at least one of the first and second engagement elements to be cut off by a contact between at least one of the first and second engagement elements and the inner wall surface of the fixed part, wherein
the first input side engaging part includes a first contact part and a second contact part being able to come into contact with the first engagement element when the rotational torque is input to the input member, the first contact part and the second contact part being disposed apart from each other in a second radial direction orthogonal to the first radial direction,
the second input side engaging part includes a third contact part and a fourth contact part being able to come into contact with the second engagement element when the rotational torque is input to the input member, the third contact part and the fourth contact part being disposed apart from each other in the second radial direction, the output side engaging part includes a fifth contact part and a sixth contact part being able to come into contact with the first engagement element when the rotational torque is input to the output member, the fifth contact part and the sixth contact part being disposed apart from each other in the second radial direction, the output side engaging part includes a seventh contact part and an eighth contact part being able to come into contact with the second engagement element when the rotational torque is input to the output member, the seventh contact part and the eighth contact part being disposed apart from each other in the second radial direction, a first group including the first contact part and the second contact part, and a second group including the third contact part and the fourth contact part are disposed apart from each other with a second reference line passing through the central axis and parallel to the second radial direction interposed therebetween, the first contact part and the second contact part of the first group are respectively disposed closer to a first reference line passing through the central axis and parallel to the first radial direction than the fifth contact part and the sixth contact part, and the third contact part and the fourth contact part of the second group are respectively disposed farther from the first reference line than the seventh contact part and the eighth contact part.

2. The reverse input cutoff clutch according to claim 1, wherein the first contact part, the second contact part, the third contact part, the fourth contact part, the fifth contact part, the sixth contact part, the seventh contact part, and the eighth contact part respectively have a first distance, a second distance, a third distance, a fourth distance, a fifth distance, a sixth distance, a seventh distance, and an eighth distance as a distance from the first reference line in the second radial direction, and the first distance and the second distance are respectively smaller than the fifth distance and the sixth distance, and the third distance and the fourth distance are respectively larger than the seventh distance and the eighth distance.

3. The reverse input cutoff clutch according to claim 1, wherein the first engagement element includes a ninth contact part and a tenth contact part being able to come into contact with the inner wall surface of the fixed part when the rotational torque is input to the output member, the ninth contact part and the tenth contact part being disposed apart from each other in the second radial direction, the second engagement element includes an eleventh contact part and a twelfth contact part being able to come into contact with the inner wall surface of the fixed part when the rotational torque is input to the output member, the eleventh contact part and the twelfth contact part being disposed apart from each other in the second radial direction, and in at least one of four quadrants divided by the first reference line and the second reference line, when the rotational torque is input to the output member, the fifth contact part or the eighth contact part is disposed in a region between the second reference line and a virtual straight line connecting the ninth contact part or the twelfth contact part, and the central axis.

4. The reverse input cutoff clutch according to claim 3, wherein when the rotational torque is input to the output member, the fifth contact part or the eighth contact part is disposed in a region between the second reference line and the virtual straight line in each of two quadrants which are in a positional relationship diagonally opposite to each other among the four quadrants.

5. The reverse input cutoff clutch according to claim 1, wherein the first engagement element includes a ninth contact part and a tenth contact part being able to come into contact with the inner wall surface of the fixed part when the rotational torque is input to the output member, the ninth contact part and the tenth contact part being disposed apart from each other in the second radial direction, the second engagement element includes an eleventh contact part and a twelfth contact part being able to come into contact with the inner wall surface of the fixed part when the rotational torque is input to the output member, the eleventh contact part and the twelfth contact part being disposed apart from each other in the second radial direction, and in at least one of four quadrants divided by the first reference line and the second reference line, when the rotational torque is input to the output member, the sixth contact part or the seventh contact part is disposed in a region between the second reference line and a virtual straight line connecting the tenth contact part or the eleventh contact part, and the central axis.

6. The reverse input cutoff clutch according to claim 5, wherein when the rotational torque is input to the output member, the sixth contact part or the seventh contact part is disposed in a region between the second reference line and the virtual straight line in each of two quadrants which are in a positional relationship diagonally opposite to each other among the four quadrants.

7. A reverse input cutoff clutch comprising:

a fixed part having an inner wall surface;

an input member including an input shaft, and first and second input side engaging parts disposed apart from each other in a first radial direction with a central axis of the input shaft interposed therebetween;

an output member including an output shaft disposed coaxially with the input shaft, and an output side engaging part disposed between the first input side engaging part and the second input side engaging part in the first radial direction; and first and second engagement elements disposed to be able to change a position and/or a posture thereof, and configured such that if a rotational torque is input to the input member, the rotational torque is transmitted to the output member via at least one of the first and second engagement elements, and if a rotational torque is input to the output member, at least a part of the rotational torque is transmitted to at least one of the first and second engagement elements to be cut off by a contact between at least one of the first and second engagement elements and the inner wall surface of the fixed part, wherein the first input side engaging part includes a first contact part and a second contact part being able to come into contact with the first engagement element when the rotational torque is input to the input member, the first contact part and the second contact part being disposed apart from each other in a second radial direction orthogonal to the first radial direction, the second input side engaging part includes a third contact part and a fourth contact part being able to come into contact with the second engagement element when the rotational torque is input to the input member, the third contact part and the fourth contact part being disposed apart from each other in the second radial direction, the output side engaging part includes a fifth contact part and a sixth contact part being able to come into contact with the first engagement element when the rotational torque is input to the output member, the fifth contact part and the sixth contact part being disposed apart from each other in the second radial direction, the output side engaging part includes a seventh contact part and an eighth contact part being able to come into contact with the second engagement element when the rotational torque is input to the output member, the seventh contact part and the eighth contact part being disposed apart from each other in the second radial direction, a first group including the first contact part and the third contact part, and a second group including the second contact part and the fourth contact part are disposed apart from each other with a first reference line passing through the central axis and parallel to the first radial direction interposed therebetween, the first contact part and the third contact part of the first group are respectively disposed closer to the first reference line than the fifth contact part and the seventh contact part, and the second contact part and the fourth contact part of the second group are respectively disposed farther from the first reference line than the sixth contact part and the eighth contact part.

8. The reverse input cutoff clutch according to claim 7, wherein the first contact part, the second contact part, the third contact part, the fourth contact part, the fifth contact part, the sixth contact part, the seventh contact part, and the eighth contact part respectively have a first distance, a second distance, a third distance, a fourth distance, a fifth distance, a sixth distance, a seventh distance, and an eighth distance as a distance from the first reference line in the second radial direction, and the first distance and the third distance are respectively smaller than the fifth distance and the seventh distance, and the second distance and the fourth distance are respectively larger than the sixth distance and the eighth distance.

\* \* \* \* \*